United States Patent
Morita

(10) Patent No.: US 11,611,294 B2
(45) Date of Patent: Mar. 21, 2023

(54) VIBRATION DRIVING DEVICE, APPARATUS EQUIPPED WITH VIBRATION DRIVING DEVICE, CONTROL DEVICE AND CONTROL METHOD FOR VIBRATION ACTUATOR

(71) Applicant: CANON KABUSHIKI KAISHA, Tokyo (JP)

(72) Inventor: Hiromitsu Morita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/345,792

(22) Filed: Jun. 11, 2021

(65) Prior Publication Data
US 2021/0399654 A1 Dec. 23, 2021

(30) Foreign Application Priority Data
Jun. 18, 2020 (JP) .............................. JP2020-105643

(51) Int. Cl.
*H02N 2/06* (2006.01)
*G02B 21/24* (2006.01)
*G02B 26/08* (2006.01)

(52) U.S. Cl.
CPC ........... *H02N 2/062* (2013.01); *G02B 21/241* (2013.01); *G02B 26/0875* (2013.01)

(58) Field of Classification Search
CPC ...... H02N 2/062; H02N 2/026; H02N 2/0015; H02N 2/103; G02B 21/241; G02B 26/0875
See application file for complete search history.

(56) References Cited

U.S. PATENT DOCUMENTS

| 9,843,276 B2 | 12/2017 | Morita et al. |
| 10,187,578 B2 * | 1/2019 | Sumioka .................. H02N 2/06 |
| 2021/0021211 A1 | 1/2021 | Morita |

FOREIGN PATENT DOCUMENTS

JP 2017-143602 A 8/2017

* cited by examiner

*Primary Examiner* — Emily P Pham
(74) *Attorney, Agent, or Firm* — Venable LLP

(57) ABSTRACT

A vibration driving device that improves controllability in low speed driving. The vibration driving device includes a vibration actuator that includes a vibrator that has an elastic member and an electro-mechanical energy conversion element, a contact member that contacts the vibrator, and a control device that controls drive of the vibration actuator. The control device includes a speed detection unit that detects speed information showing relative speed of the vibrator and the contact member, and an adjustment unit that decreases amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator.

15 Claims, 20 Drawing Sheets

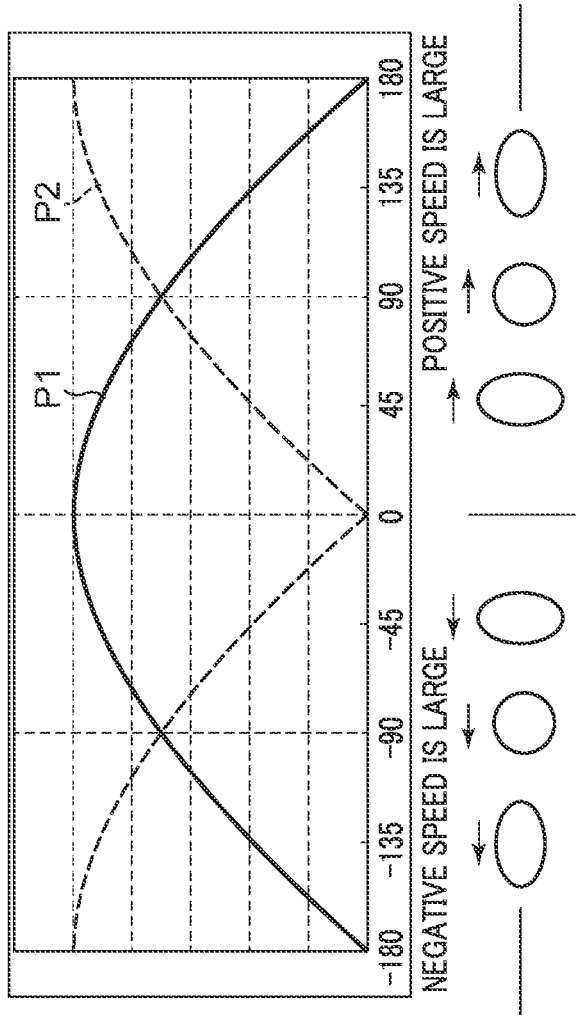
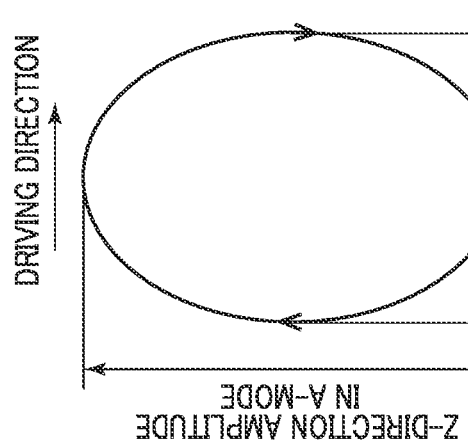

VIBRATION DRIVING DEVICE, APPARATUS EQUIPPED WITH VIBRATION DRIVING DEVICE, CONTROL DEVICE AND CONTROL METHOD FOR VIBRATION ACTUATOR

BACKGROUND OF THE INVENTION

Field of the Invention

The present invention relates to a vibration driving device, an apparatus equipped with the vibration driving device, a control device, and a control method for a vibration actuator that constitutes the vibration driving device.

Description of the Related Art

A vibration actuator that relatively moves a vibrator and contact member by an elliptic movement that is caused at a predetermined mass point of the vibrator is used to drive a focusing lens for autofocus in a digital camera, for example. A digital camera in recent years is required to provide a moving image capturing function in addition to a still image capturing function from the former. The moving image capturing function requires to increase a driving speed of a focusing lens and to improve driving stability in low speed driving.

Against such a requirement, Japanese Laid-Open Patent Publication (Kokai) No. 2017-143602 (JP 2017-143602A) suggests a technique that improves controllability by performing position feedback control using frequency or phase difference so as not to generate a mechanical resonance peak near a high frequency range within a control and by reducing a pulse width in low speed driving.

However, the technique disclosed in the above-mentioned publication causes the following problem when a vibration actuator is controlled in low relative moving speed between a vibrator and a contact member like several micrometers/second. That is, since the vibration actuator relatively moves the vibrator and contact member by friction drive, it has a blind zone owing to static friction force. Accordingly, when the control amount by feedback control using a relative position or a relative speed between the vibrator and contact member belongs to this blind zone, the vibration actuator does not operate. That is, since very low speed driving of the vibration actuator minimizes the control amount, the problem that the vibration actuator does not operate occurs as a result.

Against this, when the control amount increases and escapes from the blind zone, the actual control amount is largely deviated from an inherent control amount. As a result, sudden start and sudden stop are repeated, and an abnormal noise may occur on each occasion. Then, the optimal control amount and the width of the blind zone vary with variation of temperature and humidity in environment where the vibration actuator is arranged, variation of a contact state between the vibrator and contact member, fluctuation of a drive load, etc. Accordingly, it is difficult to improve the controllability in low speed driving while considering all these variation factors.

SUMMARY OF THE INVENTION

The present invention provides a vibration driving device that improves controllability in low speed driving.

Accordingly, a first embodiment of the present disclosure provides a vibration driving device including a vibration actuator that includes a vibrator that has an elastic member and an electro-mechanical energy conversion element, a contact member that contacts the vibrator, and a control device that controls drive of the vibration actuator. The control device includes a speed detection unit configured to detect speed information showing relative speed of the vibrator and the contact member, and an adjustment unit configured to decrease amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator.

According to the present invention, the controllability in the low speed driving is improved.

Further features of the present invention will become apparent from the following description of exemplary embodiments with reference to the attached drawings.

BRIEF DESCRIPTION OF THE DRAWINGS

FIG. 3A, FIG. 3B, and FIG. 3C are explanatory views showing vibration excited in a vibrator that constitutes the vibration actuator.

DESCRIPTION OF THE EMBODIMENTS

Figure 1:
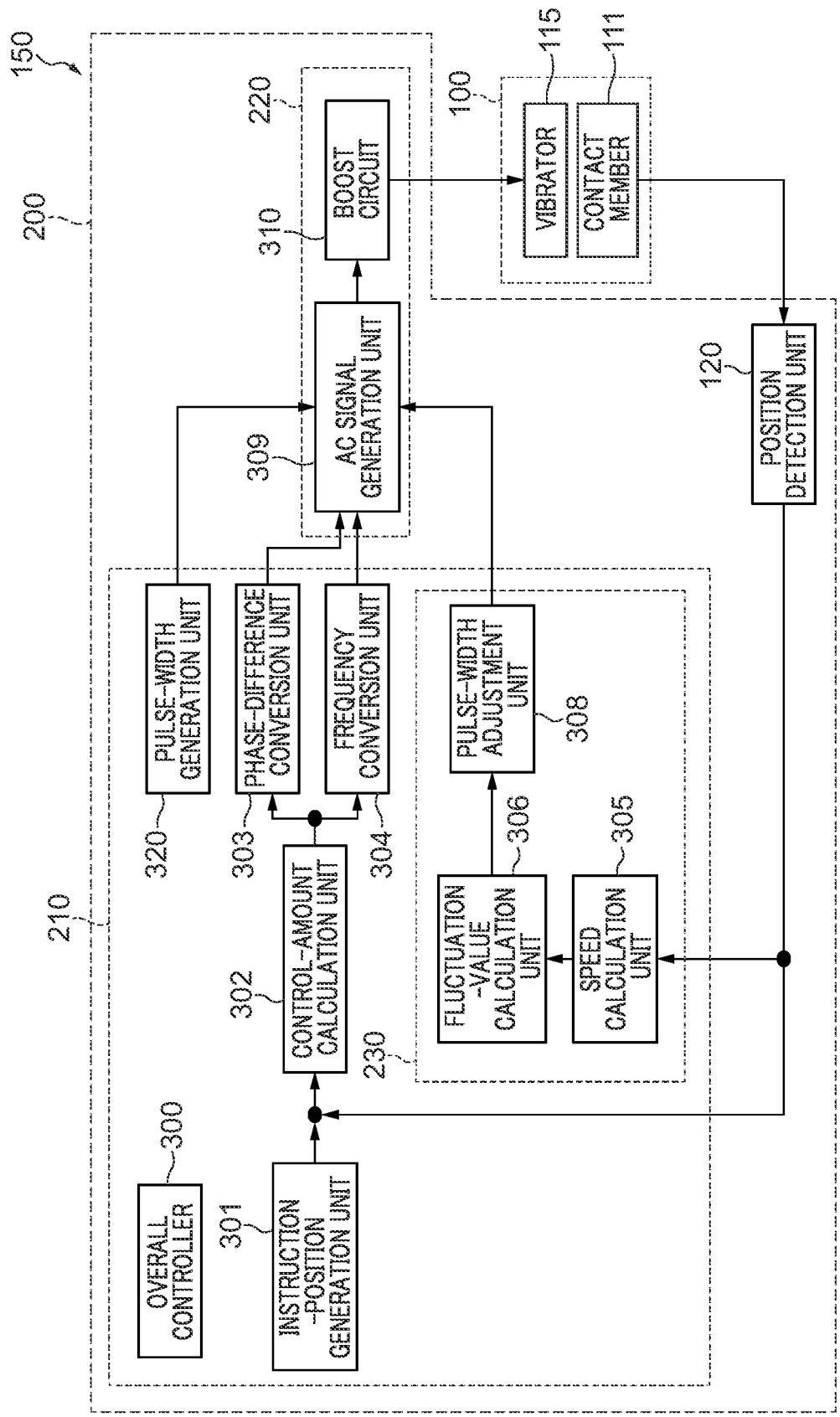
FIG. 1 is a block diagram showing a schematic configuration of a vibration driving device according to a first embodiment.

Hereafter, embodiments according to the present invention will be described in detail by referring to the drawings. In the following description, a "vibration driving device" includes a "vibration actuator" and a "control device", the "vibration actuator" includes a "vibrator" and a "contact member", and a "vibrator" includes an "elastic member" and an "electro-mechanical energy conversion element".

FIG. 1 is a block diagram showing a schematic configuration of a vibration driving device 150 according to a first embodiment. The vibration driving device 150 is formed of a vibration actuator 100 and a control device 200 that controls drive of the vibration actuator 100.

Figure 2A:
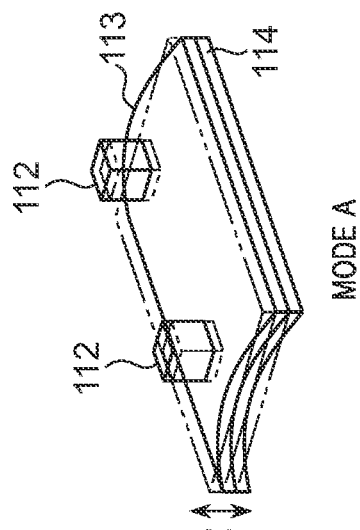
FIG. 2A, FIG. 2B, FIG. 2C, and FIG. 2D are explanatory views showing a vibration actuator that constitutes the vibration driving device.

The schematic configuration and driving principle of the vibration actuator 100 will be described first. FIG. 2A is a perspective view showing the schematic configuration of the vibration actuator 100. The vibration actuator 100 is provided with a contact member 111 and a vibrator 115. The vibrator 115 has an elastic member 113, a piezoelectric device 114, and projections 112. The elastic member 113 is made from metal material, such as stainless steel, and has an approximately rectangular plate shape. The piezoelectric device 114 is an electro-mechanical energy conversion element and has a rectangle plate-shaped piezoelectric member and electrodes. Below-mentioned electrodes A1 and A2 are formed on one surface of the piezoelectric member and a common electrode (whole-surface electrode) is formed on the other surface. The piezoelectric device 114 is joined to one surface (a first surface) of the elastic member 113 with adhesive etc. The two projections 112 are provided on the other surface (second surface of the opposite side of the first surface) of the elastic member 113. Top surfaces of the projections 112 contact the contact member 111 by a pressure unit (not shown).

Figure 2C:
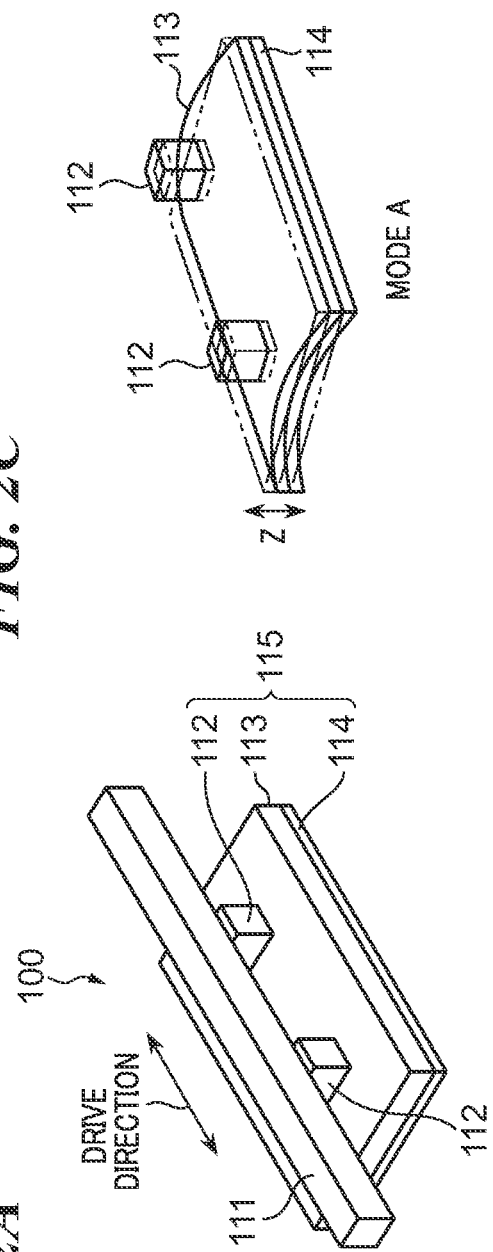
Figure 2B:
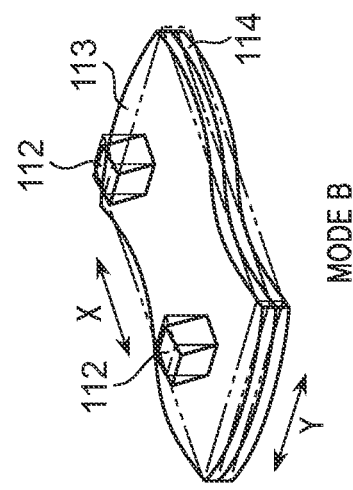
Figure 2D:
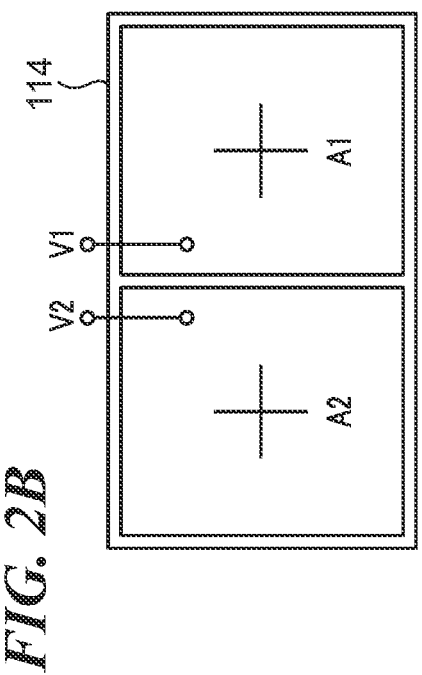

FIG. 2B is a plan view showing a schematic configuration of the piezoelectric device 114. FIG. 2C is a view describing vibration of a first vibration mode (hereinafter referred to as an "A-mode") excited in the vibrator 115. FIG. 2D is a view describing vibration of a second vibration mode (hereinafter referred to as a "B-mode") excited in the vibrator 115. A direction that connects the two projections 112 is defined as an X-direction, a direction of thickness of the elastic member 113 is defined as a Z-direction, and a direction that intersects perpendicularly with both the X-direction and the Z-direction is defined as a Y-direction.

As shown in FIG. 2B, the two electrodes A1 and A2 are formed on one surface (surface that is not joined to the elastic member 113) of the piezoelectric device 114 so as to divide the surface into equal halves in the X-direction (longitudinal direction). The polarization directions of the piezoelectric member in the electrodes A1 and A2 are the thickness direction (Z-direction) and the polarities are the same direction (+). The single common electrode is formed on the other surface (surface that is joined to the elastic member 113) of the piezoelectric device 114. AC drive voltage V1 is applied to the electrode A1, and AC drive voltage V2 is applied to the electrode A2. When the drive voltages V1 and V2 are the same phase AC voltages of which frequencies are near a resonance frequency of the A-mode, the piezoelectric device 114 will expand at a certain moment and will contract at another moment as a whole. As a result, vibration of the A-mode shown in FIG. 2C occurs in the vibrator 115. The A-mode is a primary out-of-plane bending vibration mode in which two nodes in approximately parallel to the X-direction appear in the vibrator 115.

Moreover, when the drive voltages V1 and V2 are the AC voltages of which phases differ by 180 degrees and frequencies are near a resonance frequency of the B-mode, the area of the electrode A1 of the piezoelectric device 114 will expand and the area of the electrode A2 will contract at a certain moment, and a phenomenon of reverse occurs at another moment. As a result, vibration of the B-mode shown in FIG. 2D occurs in the vibrator 115. The B-mode is a secondary out-of-plane bending vibration mode in which three nodes approximately parallel to the Y-direction appear in the vibrator 115.

FIG. 3A is a view describing elliptic oscillation excited at the tips of the projections 112. Each of the projections 112 is arranged at a position near an antinode of the vibration of the A-mode and a node of the vibration of the B-mode. Accordingly, the tip of the projection 112 reciprocates in the X-direction by pendulum motion with the node of the vibration of the B-mode as a fulcrum and reciprocates in the Z direction by the vibration of the A-mode. Accordingly, when the vibrations of the A-mode and B-mode are simultaneously excited and are overlapped so that the vibration phase difference will be near ±pi/2, the elliptic movement within an XZ plane occurs in the tip surface of the projection 112.

Since the frictional force by contact is working between the tip surfaces of the two projections 112 and the contact member 111, the elliptic movements of the tip surfaces of the projections 112 cause friction driving force that relatively moves the vibrator 115 and the contact member 111 in the X-direction. Hereinafter, the ratio of the Z-direction amplitude and X-direction amplitude of the elliptic movement of FIG. 3A that occurs at the tips of the projections 112 is defined as elliptical ratio of the elliptic movement.

FIG. 3B is a view describing the amplitudes of the A-mode and B-mode when the phase difference between the drive voltages V1 and V2 is changed from −180 degrees to 180 degrees. A horizontal axis represents the phase difference and a vertical axis represents the vibration amplitude. A curve P1 shows the amplitude of the A-mode and a curve P2 shows the amplitude of the B-mode. The elliptic movement is excited on the tip surfaces of the projections 112 by combining the vibrations of the A-mode and B-mode. And the elliptical ratio depends on the phase difference between the AC voltages V1 and V2. It should be noted that elliptical shapes corresponding to phase differences are schematically illustrated in the lower part of FIG. 3B.

The driving direction (the direction of relative displacement of the vibrator 115 and the contact member 111) of the vibration actuator 100 can be switched by switching the plus and minus of the phase difference of the drive voltages V1 and V2. Moreover, the phase difference of the drive voltages V1 and V2 can be continuously changed between any plus value and any minus value. Thereby, when the phase difference is continuously changed from 90 degrees to −90 degrees, for example, the driving speed (relative speed between the vibrator 115 and the contact member 111) of the vibration actuator 100 can be continuously changed and the driving direction can be switched.

FIG. 3C is a view showing relation between driving frequency and driving speed of the vibration actuator 100. The driving speed reaches a peak when the driving frequency is equal to the resonance frequency fm of the vibration actuator 100, is lowered gently at the higher frequency side than the resonance frequency fm, and rapidly lowered at the lower frequency side than the resonance frequency fm. Accordingly, the amplitude of the elliptic oscillation is changed while keeping the elliptical ratio by changing the frequency of the drive voltages V1 and V2. For example, the driving speed is increased by bringing the frequency of the drive voltages V1 and V2 close to the resonance frequency fm to enlarge the elliptic oscillation. Moreover, the driving speed is lowered by keeping the frequency of the drive voltages V1 and V2 away from the resonance frequency fm to reduce the elliptic oscillation.

Next, the configuration of the control device 200 will be described. As shown in FIG. 1, the control device 200 is constituted by a controller 210, drive unit 220, and position detection unit 120. The controller 210 has an instruction-position generation unit 301, a control-amount calculation unit 302, a phase-difference conversion unit 303, a frequency conversion unit 304, a feature control unit 230, and a pulse-width generation unit 320. The feature control unit 230 has a speed calculation unit 305, fluctuation-value calculation unit 306, and a pulse-width adjustment unit 308. The drive unit 220 has an AC signal generation unit 309 and a boost circuit 310.

The position detection unit 120 is an encoder, for example, and detects the relative position of the vibrator 115 and the contact member 111. It should be noted that the position detection unit 120 is separated from the controller 210 and drive unit 220 as hardware and is provided in the vibration actuator 100 in general. However, the position detection unit 120 is included in the control device 200 as a component required to control the vibration actuator 100 for convenience of description.

The control device 200 is configured to add the feature control unit 230 to a well-known control device that determines the phase difference and frequency while keeping the pulse width constant according to a control amount that is determined from deviation between an instruction position generated by the instruction-position generation unit 301 and a position detected by the position detection unit 120.

The controller 210 is what is called a microcomputer and consists of electric parts, such as a calculation unit (CPU), a memory that stores programs, and a memory as a workspace to which a program is developed. Each part of the controller 210 is a functional block of the microcomputer and performs a specific operation like generation of a signal that has information for controlling actuation of the vibration actuator 100.

An overall controller 300 performs entire control of the controller 210 by controlling the respective functional blocks. The instruction-position generation unit 301 generates the instruction position to which the contact member 111 is moved. The instruction position is a stop position that varies with time. The instruction position is set up in order to perform position control for moving the contact member 111 to a final target stop position. The signal about the deviation between the instruction position that is an output of the instruction-position generation unit 301 and the position detected by the position detection unit 120 is input into the control-amount calculation unit 302. Furthermore, the overall controller 300 calculates this deviation. The control-amount calculation unit 302 calculates the control amount of the vibrator 115.

The control amount output from the control-amount calculation unit 302 is input into the phase-difference conversion unit 303 and frequency conversion unit 304. The phase-difference conversion unit 303 determines the elliptical ratio of the elliptic movement excited in the projections 112 of the vibrator 115 by converting the control amount obtained from the control-amount calculation unit 302 into the phase difference. The frequency conversion unit 304 determines the size of the ellipse of the elliptic movement excited in the projections 112 of the vibrator 115 by converting the control amount obtained from the control-amount calculation unit 302 into the frequency. The phase difference converted by the phase-difference conversion unit 303 is the phase difference between the drive voltages V1 and V2 respectively applied to the electrodes A1 and A2 of the piezoelectric device 114.

The speed calculation unit 305 obtains the signal indicating the relative position of the vibrator 115 and contact member 111 from the position detection unit 120 and calculates a driving speed. The driving speed is an amount of change of the relative position of the vibrator 115 and contact member 111 per unit time. The driving speed is calculated from the current relative position obtained from the position detection unit 120, the relative position in the last control cycle, and the period of one control cycle. The control cycle means a cycle by which the control amount of position feedback control is updated. The value of the driving speed output from the speed calculation unit 305 is input into the fluctuation-value calculation unit 306.

The fluctuation-value calculation unit 306 calculates the fluctuation value of the driving speed obtained from the speed calculation unit 305 as the speed information about the vibration actuator 100. Although this fluctuation value is the difference between the current value and the value of the last control cycle, it is not limited to this. The fluctuation value may be a difference between the current value and a value of a control cycle preceding two or more cycles, such as five cycles or ten cycles, from the current cycle. It should be noted that the value (value output from the position detection unit 120) before applying the speed calculation by the speed calculation unit 305 may be input into the fluctuation-value calculation unit 306. The pulse-width adjustment unit 308 decreases the constant pulse width output from the pulse-width generation unit 320 when the calculation value obtained from the fluctuation-value calculation unit 306 exhibits alternate fluctuations in position and speed (details are mentioned below).

As shown in FIG. 1, the output signals of the phase-difference conversion unit 303, frequency conversion unit 304, pulse-width generation unit 320, and pulse-width adjustment unit 308 are input into the AC signal generation unit 309. The AC signal generation unit 309 is a driver circuit that generates two-phase AC pulse signals by switching, for example. Details are mentioned below.

Figure 4:
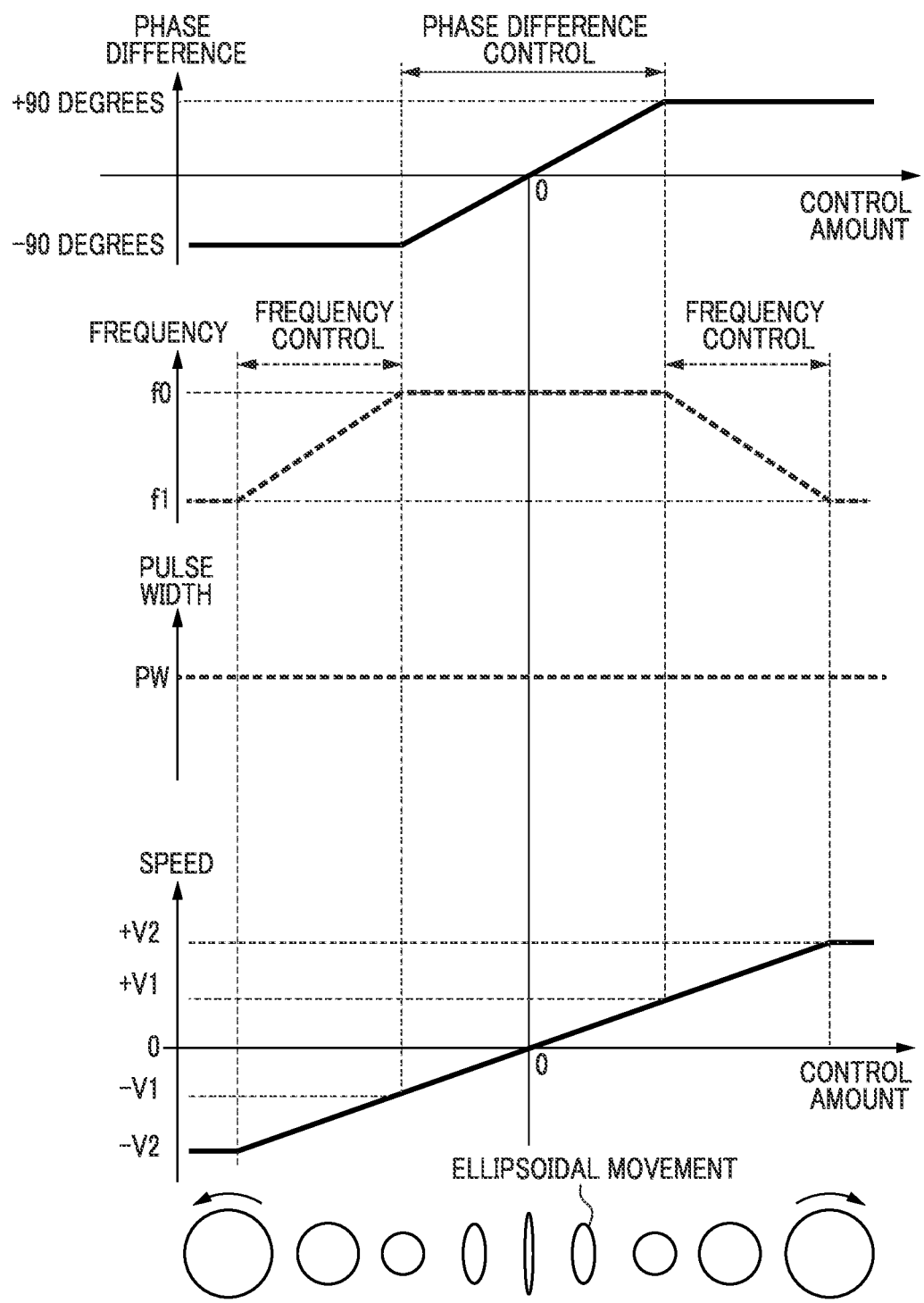
FIG. 4 is a view showing relation between a control amount output from a control amount calculation unit of a control device, an output from a controller, and speed of a contact member.

FIG. 4 is a view showing relation between the control amount output from the control amount calculation unit 302, an output from the controller 210, and the driving speed (moving speed of the contact member 111). A range where the absolute value of the control amount outputted from the control-amount calculation unit 302 is small is defined as a phase difference control range in which the phase difference and driving frequency are controlled by changing the phase difference between the drive voltages V1 and V2 for driving the vibration actuator 100. In the meantime, ranges where the absolute value of the control amount outputted from the control-amount calculation unit 302 is large are defined as frequency control ranges in which the phase difference and driving frequency are controlled by changing the driving frequency of the drive voltages V1 and V2. In this way, the phase difference control and frequency control are switched according to the control amount output from the control-amount calculation unit 302.

In this embodiment, when the phase difference converted by the phase-difference conversion unit 303 does not reach an upper limit or a lower limit, the driving frequency is set to an upper limit, and the AC signal generation unit 309 generates the two-phase AC pulse signals that have the phase difference and the driving frequency. It should be noted that the state where the driving frequency is set to the upper limit means that the driving frequency is set to the highest value of a driving frequency band used to drive the vibrator 115 or to a value adjacent thereof. In the meantime, when the phase difference converted by the phase-difference conversion unit 303 reaches the upper limit or the lower limit, the driving frequency converted by the frequency conversion unit 304 is set up as-is, and the AC signal generation unit 309 generates the two-phase AC pulse signals that have the driving frequency and the phase difference. It should be noted that details of the two-phase AC pulse signals generated by the AC signal generation unit 309 are mentioned later.

When the contact member 111 is driven at a high speed, the phase difference is set to the upper limit or the lower limit, and the driving frequency converted by the frequency conversion unit 304 is output to the AC signal generation unit 309. In the meantime, when the contact member 111 is driven at a low speed, the driving frequency is set to the upper limit and the phase difference converted by the phase-difference conversion unit 303 is output to the AC signal generation unit 309. In the characteristic control of the embodiment in the low speed driving, the latter control (the phase difference converted by the phase-difference conversion unit 303 is output to the AC signal generation unit 309 while keeping the driving frequency constant) is mainly employed.

The output of the AC signal generation unit 309 is input into the boost circuit 310. Although the boost circuit 310 is constituted using a coil and a transformer, for example, it may be constituted using one of the coil and the transformer. The boost circuit 310 raises the voltage of the two-phase AC pulse signals generated by the AC signal generation unit 309 to predetermined voltage, and the generated drive voltages V1 and V2 of an approximate sine waveform are applied to the electrodes A1 and A2 of the piezoelectric device 114.

Next, a configuration of the drive unit 220 will be described in detail. The drive unit 220 is a voltage generation circuit that generates the drive voltages V1 and V2. Since configurations of circuits that respectively generate the drive voltages V1 and V2 applied to the piezoelectric device 114 in the drive unit 220 are identical, only the circuit used to generate the drive voltage V1 is described and a description about the circuit used to generate the drive voltage V2 is omitted.

Figure 5A:
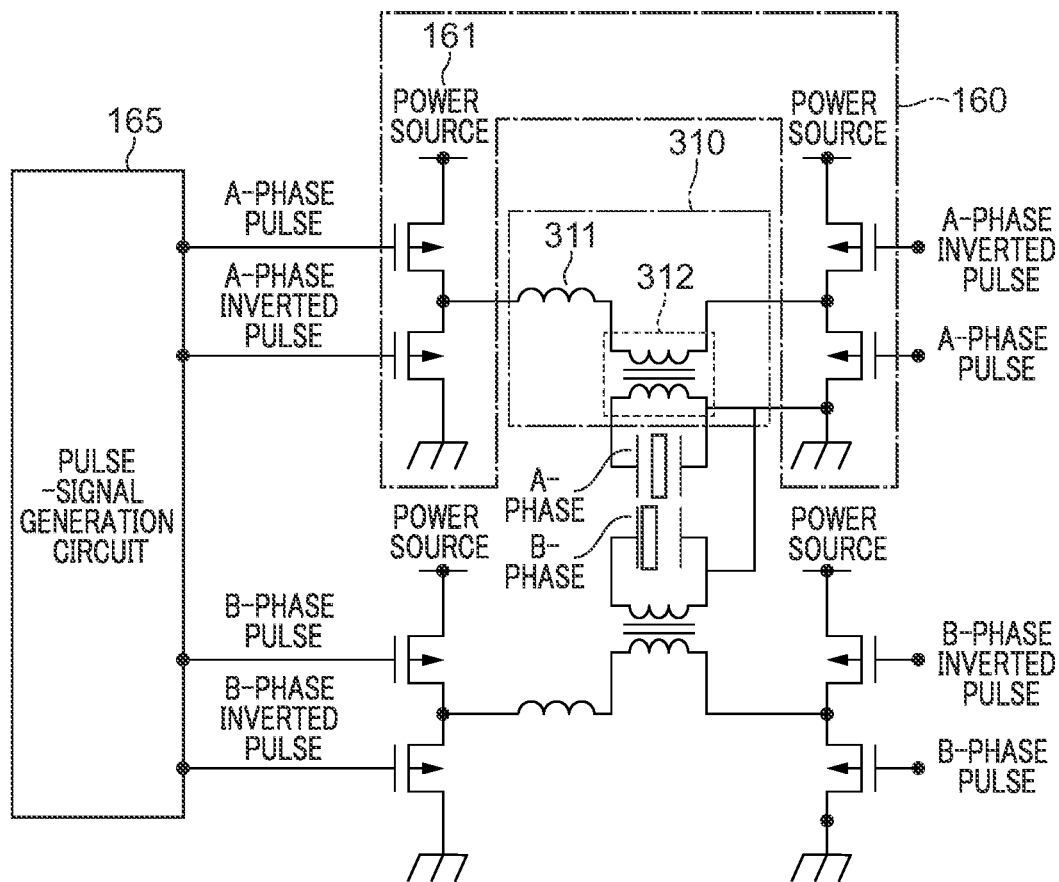
FIG. 5A and FIG. 5B are views describing a schematic configuration of a drive unit of the control device and signal waveforms to be treated.
Figure 5B:
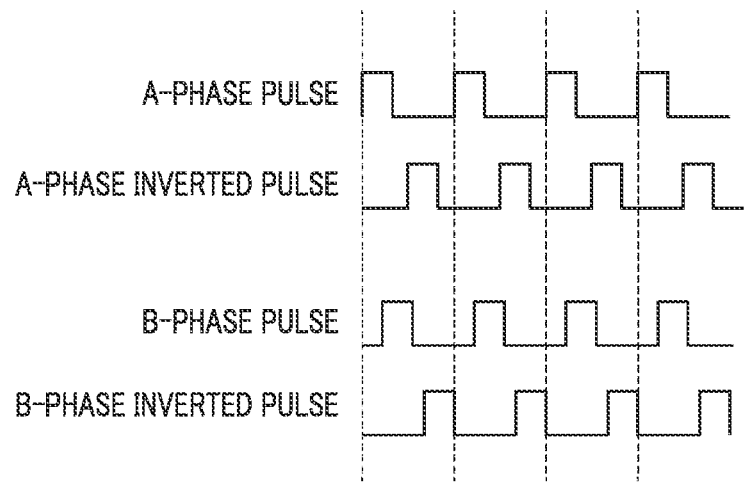

FIG. 5A is a circuit diagram showing a schematic configuration of the drive unit 220. The AC signal generation unit 309 has a pulse-signal generation circuit 165 and a switching circuit 160. The boost circuit 310 has the coil 311 and the transformer 312. The pulse signal generation circuit 165 generates a rectangular A-phase pulse signal and a rectangular A-phase inverted pulse signal that have the information about the phase difference, frequency, and pulse width on the basis of the output information from the phase-difference conversion unit 303, frequency conversion unit 304, pulse-width generation unit 320, and pulse-width adjustment unit 308. FIG. 5B is a view showing the A-phase pulse signal and the A-phase inverted pulse signal generated by the pulse signal generation circuit 165. The phase of the A-phase pulse signal is deviated by 180 degrees from the phase of the A-phase inverted pulse signal. It should be noted that FIG. 5B shows a B-phase pulse signal and a B-phase inverted pulse signal that are generated by the pulse signal generation circuit 165. The relation between the A-phase pulse signal and the B phase pulse signal is mentioned later.

The A-phase pulse signal and A-phase inverted pulse signal that are generated by the pulse signal generation circuit 165 are input into the switching circuit 160. The switching circuit 160 generates an AC pulse signal of a rectangular waveform by switch operating a DC voltage supplied from a DC power source 161 at the timing of the input pulse signal. When the pulse width of the A-phase pulse signal and A-phase inverted pulse signal generated by the pulse-signal generation circuit 165 is denoted by a duty ratio, the pulse width of the AC pulse signal generated by the AC signal generation unit 309 is also denoted by the same duty ratio. The AC pulse signal output from the AC signal generation unit 309 is input into the boost circuit 310 and is converted into the drive voltage V1 of the approximate sine waveform by rising to a predetermined voltage value in the boost circuit 310. The drive voltage V1 is applied to the electrode A1 of the piezoelectric device 114 as mentioned above.

Next, the relation between the A-phase pulse signal and B-phase pulse signal will be described. The B-phase pulse signal used for generating the drive voltage V2 applied to the electrode A2 of the piezoelectric device 114 is generated so as to have a predetermined phase difference from the A-phase pulse signal on the basis of the information about the phase difference output from the phase-difference conversion unit 303. The B-phase inverted pulse signal is generated so that the phase will be deviated by 180 degrees from the phase of the B-phase pulse signal (see FIG. 5B). The drive voltage V2 of the approximate sine waveform is generated as with the drive voltage V1.

Figure 6A:
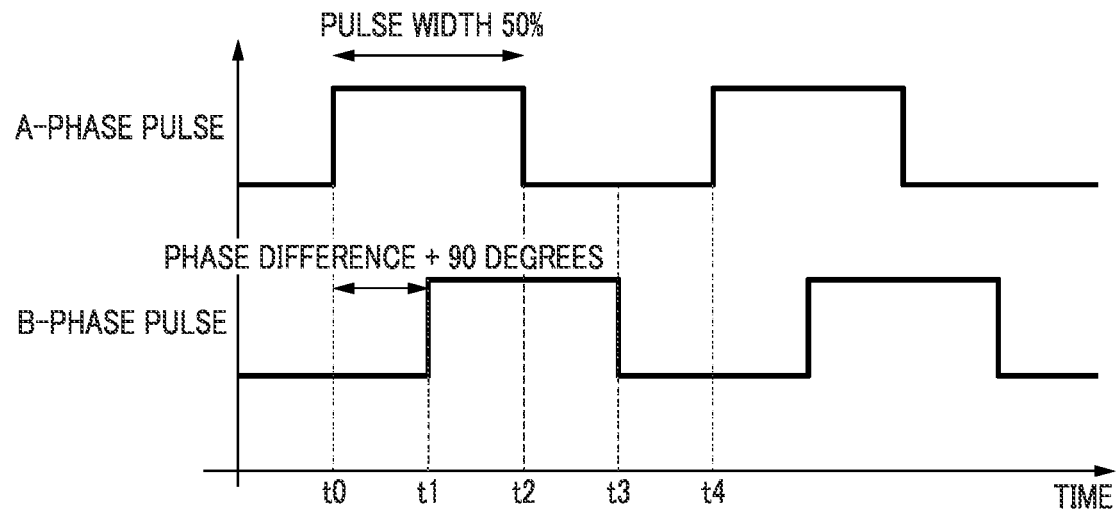
FIG. 6A and FIG. 6B are views describing pulse signals output from a pulse signal generation circuit of the control device that constitutes the vibration driving device.

FIG. 6A is a view showing an example of the A-phase pulse signal and B-phase pulse signal output from the pulse signal generation circuit 165 and is a view showing a time variation of a case where the pulse width is 50%. A period during times t0 through t4 is one cycle of the driving frequency of the drive voltage that drives the vibration actuator 100. As shown in FIG. 6A, each of the A-phase pulse signal and B-phase pulse signal is a pulse signal that outputs a High level in a period that is equivalent to 50% of one cycle. When the phase difference of the A-phase pulse signal and B-phase pulse signal is equal to +90 degrees, the A-phase pulse signal and B-phase pulse signal are output so that rises may shift by ¼ cycle (the times t0 and t1).

Figure 6B:
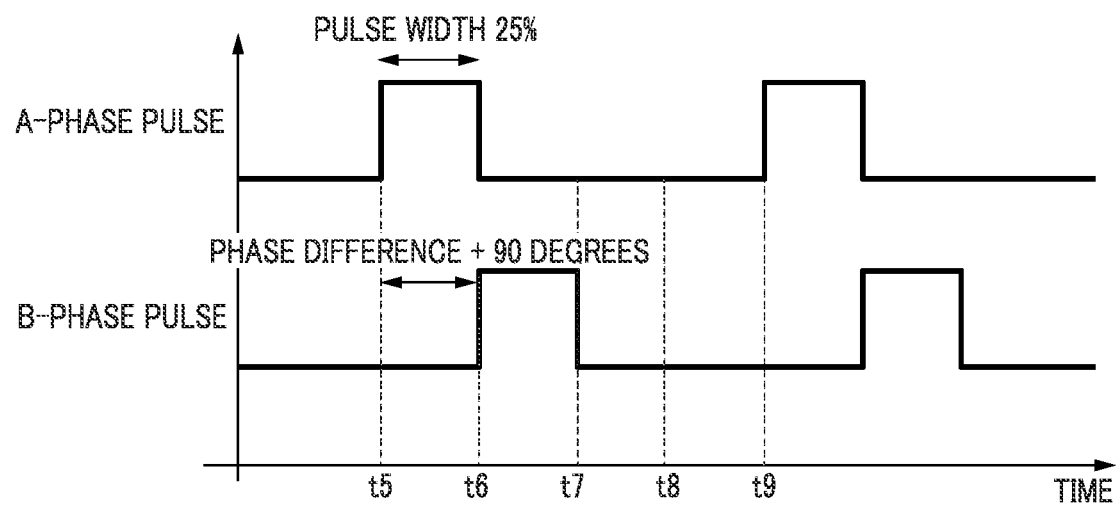

FIG. 6B is a view showing an example of the A-phase pulse signal and B-phase pulse signal output from the pulse signal generation circuit 165 and is a view showing a time variation of a case where the pulse width is 25%. A period during times t5 through t9 is one cycle of the driving frequency of the drive voltage that drives the vibration actuator 100. Each of the A-phase pulse signal and B-phase pulse signal is a pulse signal that outputs the High level in a period that is equivalent to 25% of one cycle. When the phase difference of the A-phase pulse signal and B-phase pulse signal is equal to +90 degrees, the A-phase pulse signal and B-phase pulse signal are output so that rises may shift by ¼ cycle (the times t5 and t6).

In the following description, a "pulse signal" means a general term of the A-phase pulse signal, A-phase inverted pulse signal, B-phase pulse signal, and B-phase inverted pulse signal that are output from the pulse signal generation circuit 165 and are input into the switching circuit 160 in the AC signal generation unit 309 unless otherwise mentioned. Moreover, an "AC pulse signal" means a signal that is output from the switching circuit 160 (the AC signal generation unit 309) and is input into the boost circuit 310.

Figure 7A:
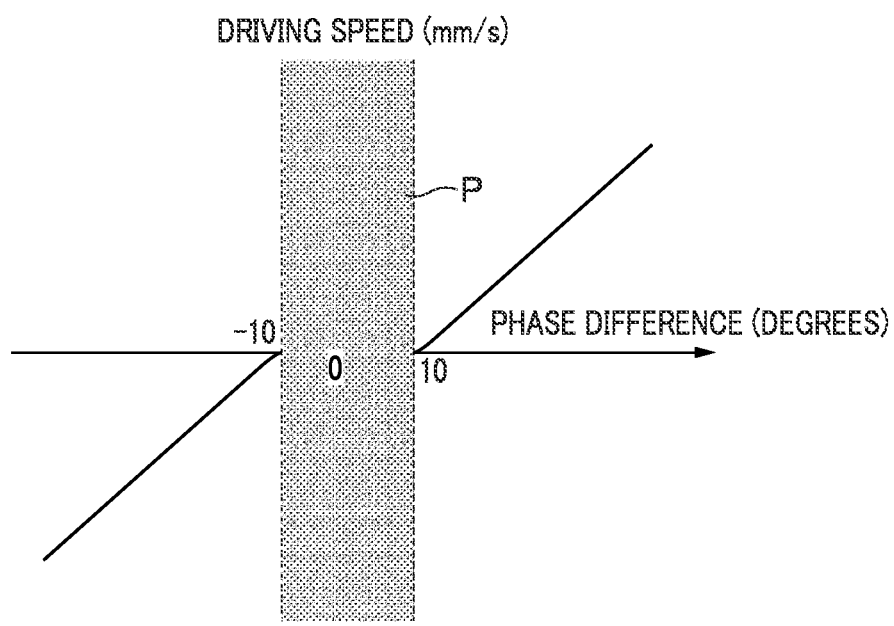
FIG. 7A and FIG. 7B are graphs describing phase difference and pulse width of a blind zone of the vibration actuator.

Next, relation between the phase difference of the drive voltages V1 and V2 and a blind zone, and relation between the pulse width of the pulse signal and the blind zone will be described by referring to FIG. 7A and FIG. 7B. FIG. 7A is a graph showing the relation between the phase difference of the drive voltages V1 and V2 applied to the piezoelectric device 114 and the driving speed of the vibration actuator 100. When the phase difference of the AC pulse signals (pulse signals output from the AC signal generation unit 309) for generating the drive voltages V1 and V2 is changed while keeping the pulse width and the driving frequency constant, the elliptical ratio of the elliptic movement varies and the driving speed varies.

When the phase difference of the AC pulse signals approaches 0 (zero), the vibration amplitude (the amplitude in the driving direction) of the B-mode becomes small and the driving speed also becomes small. In the blind zone P in which the phase difference becomes almost 0, the driving force of the vibrator 115 becomes smaller than the frictional force between the vibrator 115 (the projections 112) and the contact surface of the contact member 111.

Accordingly, the vibration actuator 100 comes into a state (hereinafter referred to as a "stopped state") in which the vibrator 115 and the contact member 111 cannot move relatively. Although the range of the blind zone is defined between ±10 degrees (the absolute values of the minus limit and plus limit are identical) in FIG. 7A, the range of the blind zone P fluctuates on the basis of external factors, such as characteristics of the vibration actuator 100, temperature, and humidity. Moreover, the absolute values of the minus limit and plus limit that define the range of the blind zone P are not necessarily identical.

Figure 7B:
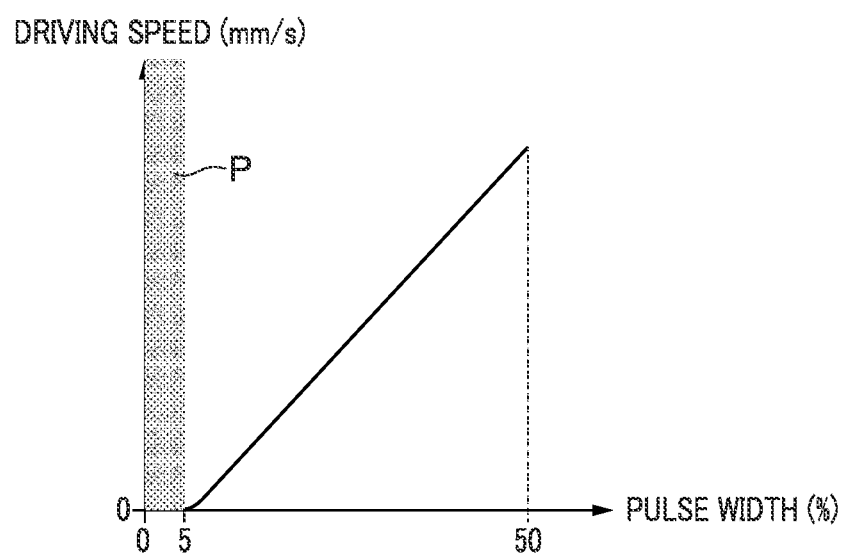

FIG. 7B is a graph showing the relation between the pulse width of the pulse signals for generating the drive voltages V1 and V2 applied to the piezoelectric device 114 and the driving speed of the vibration actuator 100. As shown in FIG. 7B, when the pulse width is changed while keeping the frequency and phase difference of the pulse signals constant, the driving speed varies in accordance with the value of the pulse width. When the pulse width of the pulse signals approaches 0 (zero), the vibration amplitude of the A-mode becomes small and the driving speed also becomes small. In the blind zone P, since the driving force of the vibrator 115 becomes smaller than the frictional force between the vibrator 115 (the projections 112) and the contact surface of the contact member 111, the vibration actuator 100 comes into the stopped state. It should be noted that the range of the blind zone P fluctuates on the basis of the external factors, such as characteristics of the vibration actuator 100, temperature, and humidity.

Figure 8A:
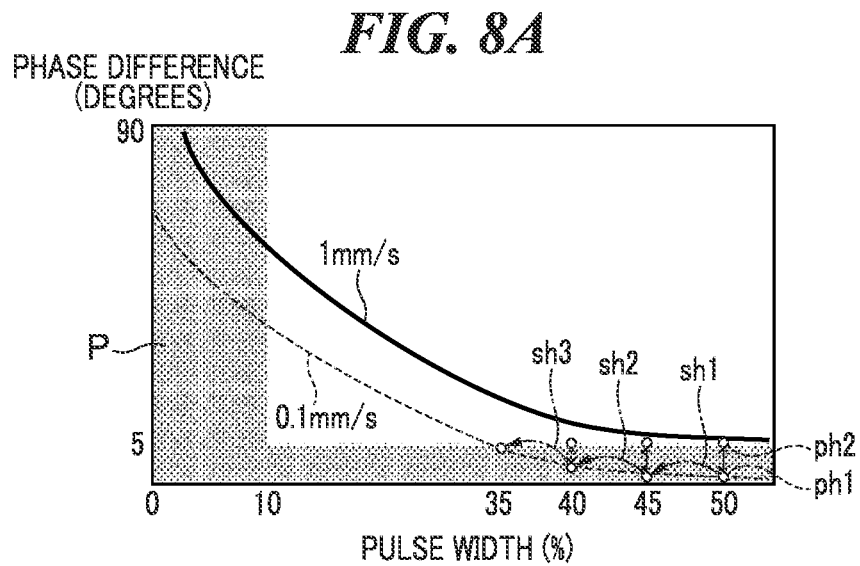
FIG. 8A, FIG. 8B, and FIG. 8C are graphs each of which shows relation between the pulse width and phase difference of the pulse signals at predetermined driving speeds.
Figure 8B:
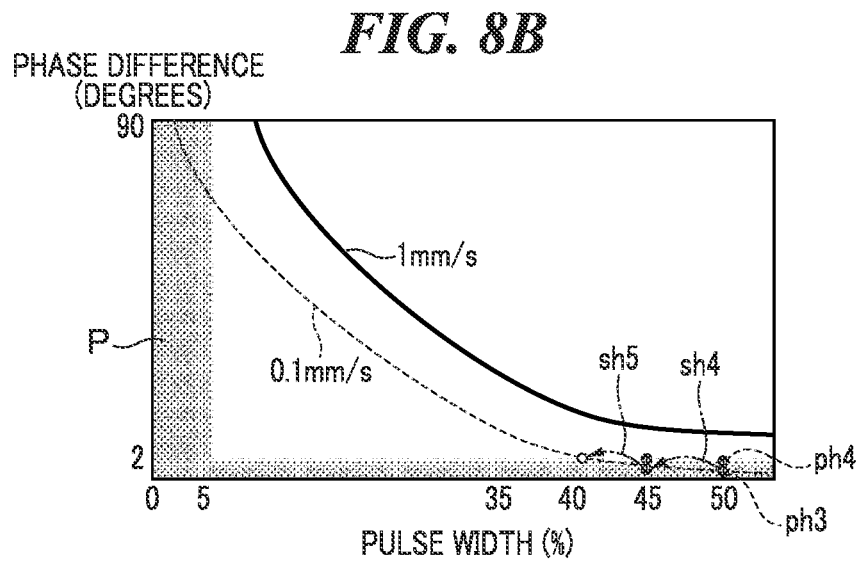
Figure 8C:
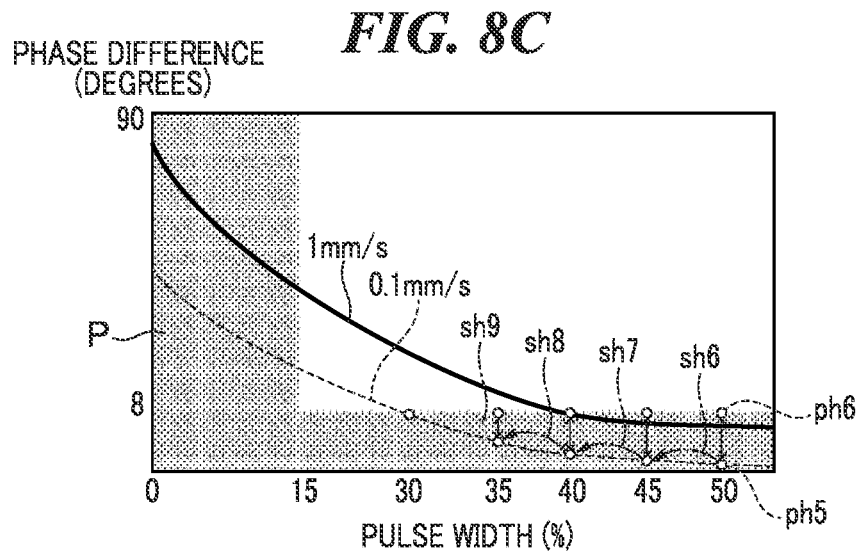

The relation between the pulse width and the phase difference of the pulse signals in low-speed control will be described in consideration of characteristics of the blind zone P by referring to FIG. 8A, FIG. 8B, and FIG. 8C. FIG. 8A, FIG. 8B, and FIG. 8C are graphs each of which shows the relation between the pulse width and phase difference of the pulse signals at predetermined driving speeds.

As shown in FIG. 8A, the relation between the pulse width and phase difference of the pulse signals at the driving speed 1 mm/s indicated by a solid line is different from that at the driving speed 0.1 mm/s indicated by a broken line. In a case of the driving speed of 1 mm/s, when the initial value of the pulse width is set in a range between 10% and 50% in order to avoid the blind zone, the drive is controllable without any problem in this range.

In the meantime, in a case of the driving speed of 0.1 mm/s, when the initial value of the pulse width is set in a range between 35% and 50%, since the control is performed under the phase difference in the blind zone P, the vibration actuator 100 does not operate. For example, when the initial value of the pulse width is set to 50% and the vibration actuator 100 is controlled at the driving speed of 0.1 mm/s, the value of the phase difference is set to ph1 in FIG. 8A. However, the vibration actuator 100 does not operate in this setting. Accordingly, since the control amount output from the control-amount calculation unit 302 increases, the value of the phase difference is shifted from ph1 to ph2 (ph2>ph1). When the value of the phase difference becomes ph2, although the vibration actuator 100 starts an operation because of escaping from the blind zone P, it operates at a driving speed faster than the inherent driving speed (target driving speed) which should be controlled. As a result, the value of the phase difference is shifted from ph2 toward ph1 in order to decrease the phase difference to lower the driving speed. Since this brings the phase difference into the blind zone P again, the vibration actuator 100 stops.

In the following description, a phenomenon where the state where the vibration actuator 100 does not operate approximately and the state where the vibration actuator 100 operates at a speed faster than the inherent driving speed alternately occur is referred to as "occurrence of alternate fluctuations in position and speed". In other words, when the alternate fluctuations in position and speed occur, the state where the vibration actuator 100 operates at a driving speed faster than the target driving speed after starting driving and the state where the vibration actuator 100 stops after that because the driving speed becomes zero are repeated. Moreover, when the alternate fluctuations in position and speed occur, the state where the relative position of the vibrator 115 and contact member 111 varies and the state where the relative position does not vary in a certain period are repeated before the vibration actuator 100 arrives at the target stop position after starting driving.

The vibration driving device 150 controls to decrease the pulse width when such alternate fluctuations in position and speed are detected. As indicated by the broken line shown in FIG. 8A, the phase difference increases as the pulse width decreases. As a result, the amplitude of the vibration of the A-mode excited in the vibrator 115 becomes small. Specifically, the pulse width is decreased from 50% to 45% as indicated by an arrow sh1 in FIG. 8A. When the alternate fluctuations in position and speed are detected even if the pulse width is changed to 45%, the pulse width is decreased from 45% to 40% as indicated by an arrow sh2. When the alternate fluctuations in position and speed are detected also in this place, the pulse width is further decreased from 40% to 35% as indicated by an arrow sh3. In this way, the control that decreases the pulse width is repeated whenever the alternate fluctuations in position and speed are detected until the fluctuations are no longer detected. In FIG. 8A, the value of the phase difference escapes from the blind zone P by decreasing the pulse width to 35% and the driving at the target driving speed of 0.1 mm/s becomes controllable.

The decreasing amount of the pulse width of the pulse signal required to escape from the blind zone P depends on the drive loads of the vibration actuator 100, for example. That is, when the drive load is small, the blind zone P becomes narrow as shown in FIG. 8B. In the example of FIG. 8B, when the alternate fluctuations in position and speed are detected in the control at the driving speed of 0.1 mm/s and the pulse width of 50%, the pulse width is decreased to 45% as indicated by an arrow sh4. Since the control that decreases the pulse width is repeated whenever the alternate fluctuations in position and speed are detected until the fluctuations are no longer detected, the value of the phase difference escapes from the blind zone P by decreasing the pulse width to 40% and the driving at the target driving speed becomes controllable.

Moreover, the decreasing amount of the pulse width of the pulse signal required to escape from the blind zone P depends on an arrangement environment (for example, temperature, humidity, etc.) of the vibration actuator 100. For example, the blind zone P becomes large under the environment of heat and high humidity as shown in FIG. 8C. In this example, when the alternate fluctuations in position and speed are detected in the control at the driving speed of 0.1 mm/s and the pulse width of 50%, the pulse width is repeatedly decreased as indicated by arrows sh6, sh7, sh8, and sh9. The value of the phase difference escapes from the blind zone P by decreasing the pulse width to 30% and the driving at the target driving speed becomes controllable.

It should be noted that the initial value of the pulse width of the pulse signal at the time of the drive start of the vibration actuator 100 is preferably set to a value (for example, 20% through 30%) that has a sufficient margin to the blind zone P in consideration of the blind zone P. Accordingly, although it can be considered that the initial value of the pulse width is set to a small value beforehand, the ranges of the phase difference and the pulse width that define the blind zone P vary in accordance with the influences of the drive load of the vibration actuator 100, the environment, etc., as mentioned above.

For example, when the vibration actuator 100 is driven at a speed lower than 0.1 mm/s in FIG. 8A, the pulse width at which the phase difference escapes from the blind zone P shall be 12% and the initial value of the pulse width at the time of start of driving control shall be set to 12%. However, when the vibration actuator 100 is arranged under the environment of heat and high humidity, the blind zone of the pulse width is 0% through 15% as shown in FIG. 8C. Accordingly, when the initial value of the pulse width is set to 12%, the vibration actuator 100 does not operate.

In order to avoid such a situation, the vibration driving device 150 achieves the control method that enables adjustment by automatically detecting a combination of the pulse width and phase difference while avoiding the blind zone of control parameters (the phase difference and pulse width) that varies in accordance with the influences of the drive load, temperature, humidity, etc. This enables smooth control of the vibration actuator 100. Hereinafter, the control method will be described.

Figure 9:
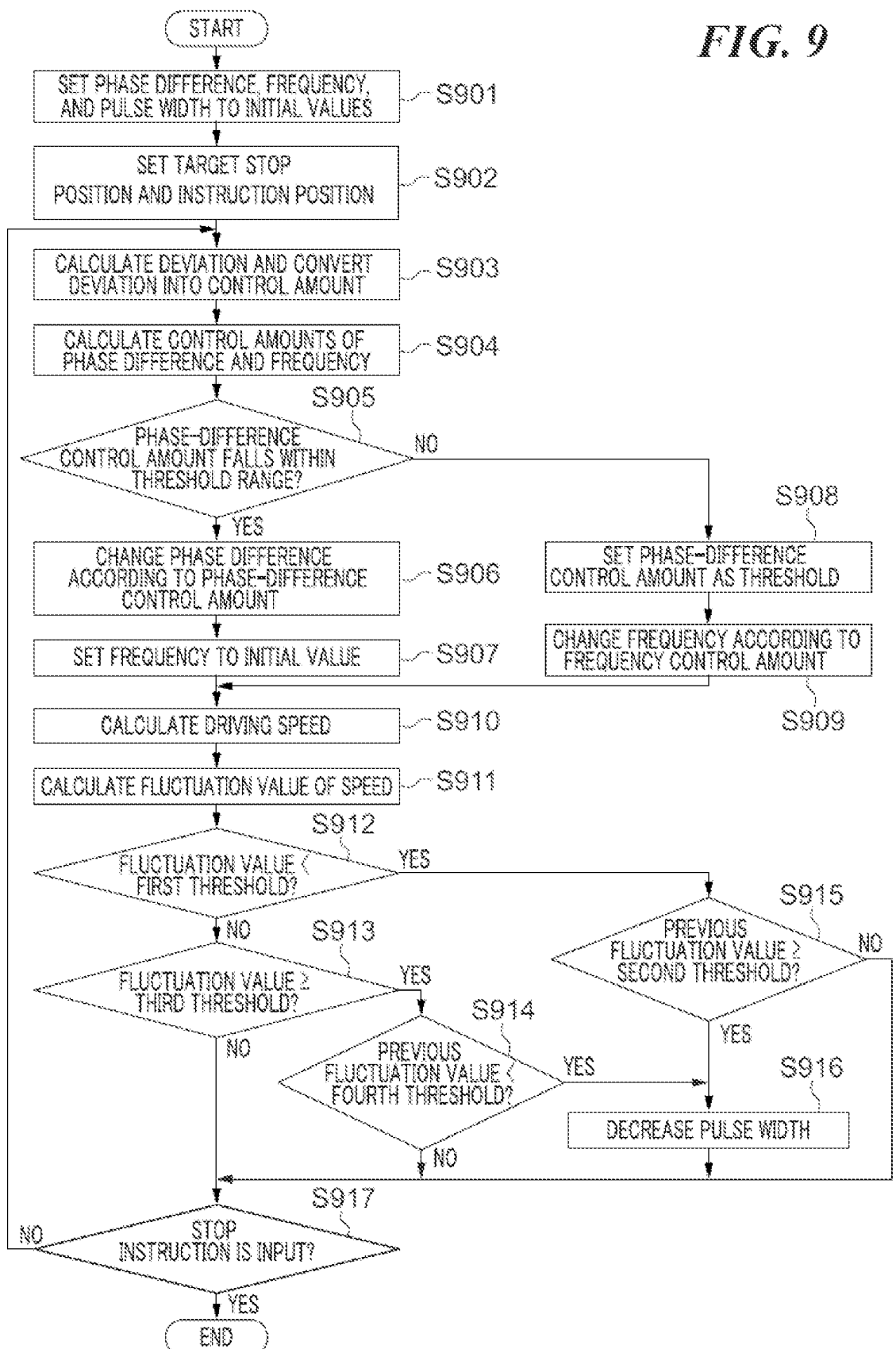
FIG. 9 is a flowchart describing a control method for the vibration driving device of FIG. 1.

FIG. 9 is a flowchart describing a control method for the vibration driving device 150. Each process (step) indicated by an S-number in the flowchart of FIG. 9 is achieved because the controller 210 (CPU) controls operations of the respective function blocks constituting the control device 200 by developing and running a predetermined program stored in the memory. It should be noted that the vibration actuator 100 shall be constituted so that the contact member 111 will move against the fixed vibrator 115 in the following description.

When the power of the control device 200 is turned on, the overall controller 300 sets the phase difference, frequency, and pulse width of the pulse signals generated with the AC signal generation unit 309 to predetermined initial values in S901. At this time, the pulse width may gradually increase to the initial value from 0%, 5%, or 10%.

The instruction-position generation unit 301 sets a target stop position at which the contact member 111 stops finally and an instruction position that varies with time in accordance with the target stop position in S902. The instruction position is set to one of acceleration that increases the driving speed of the contact member 111, constant speed that keeps the driving speed constant, and deceleration that decreases the driving speed, in general. In addition, the instruction position may a combination of the acceleration and deceleration. The instruction position is set for every unit period (every $\Delta t$, for example).

In S903, the overall controller 300 calculates the deviation between the current position of the contact member 111 detected by the position detection unit 120 and the instruction position output from the instruction-position generation unit 301, and inputs it into the control-amount calculation unit 302. Furthermore, the control-amount calculation unit 302 converts the input deviation into a control amount in S903. The phase-difference conversion unit 303 and frequency conversion unit 304 respectively convert the control amount output from the control-amount calculation unit 302 into a phase-difference control amount and a frequency control amount in S904.

The overall controller 300 determines whether the phase-difference control amount calculated in S904 falls within a range (threshold range) of predetermined thresholds (an upper limit and a lower limit) in S905. The predetermined thresholds are ±90 degrees as an example, they may be ±80 degrees or ±100 degrees. When determining that the phase-difference control amount falls within the threshold range (more than the lower limit and less than the upper limit, YES in S905), the overall controller 300 proceeds with the process to S906. The phase-difference conversion unit 303 changes the phase difference of the pulse signals to generate according to the phase-difference control amount in S906. Then, the frequency conversion unit 304 sets the frequency to an initial value in S907. In the meantime, when determining that the phase-difference control amount is out of the threshold range (NO in S905), the overall controller 300 proceeds with the process to S908. The phase-difference conversion unit 303 sets the phase-difference control amount as a threshold in S908. Then, the frequency conversion unit 304 changes the frequency of the pulse signals to generate according to the frequency control amount in S909.

The overall controller 300 proceeds with the process to S910 after the process of S907 or S909. The speed calculation unit 305 calculates the driving speed in S910 from the current position of the contact member 111 obtained from the position detection unit 120 and the previous position. The fluctuation-value calculation unit 306 calculates the fluctuation value of the driving speed in S911. Although this fluctuation value of the driving speed is difference between the current value and the value of the last control cycle, it is not limited to this. The fluctuation value may be a difference between the current value and a value of a control cycle preceding two or more cycles, such as five cycles, from the current cycle. Moreover, the fluctuation value of the driving speed may be calculated using a moving average value of the driving speeds in order to improve accuracy.

The overall controller 300 determines whether the fluctuation value of the driving speed calculated with the fluctuation-value calculation unit 306 is less than a first threshold in S912. The first threshold depends on an instruction speed that is determined on the basis of position information generated with the instruction-position generation unit 301, for example. For example, the first threshold for the fluctuation value of the driving speed is 0.5 times the instruction speed. Moreover, when the fluctuation value of the driving speed is less than the first threshold (less than the value that is 0.5 times the instruction speed), rapid deceleration of the driving speed and approach to the stopped state are recognized, and it is determined that the vibration actuator 100 does not operate approximately. However, the first threshold may be 0.3 times or 0.1 times the instruction speed or may be defined on the basis of data stored beforehand.

When determining that the fluctuation value of the driving speed calculated with the fluctuation-value calculation unit 306 is less than the first threshold (YES in S912), the overall controller 300 proceeds with the process to S915. The overall controller 300 determines whether the fluctuation value of the driving speed calculated with the fluctuation-value calculation unit 306 in the previous cycle is equal to or more than a second threshold in S915. For example, the second threshold for the fluctuation value of the driving speed is twice the instruction speed. That is, when the fluctuation value of the driving speed is equal to or more than the second threshold, it shall be equal to or more than twice the instruction speed. However, the second threshold may be equal to the instruction speed, may be three or more times the instruction speed, or may be defined on the basis of data stored beforehand. Moreover, the fluctuation value used in the determination of S915 may be an average of the fluctuation values of several cycles until the previous cycle.

When determining that the fluctuation value of the driving speed calculated with the fluctuation-value calculation unit 306 in the previous cycle is equal to or more than the second threshold (YES in S915), the overall controller 300 proceeds with the process to S916. The pulse-width adjustment unit 308 decreases the pulse width in S916. The overall controller 300 proceeds with the process to S917 after the process of S916. In the meantime, when determining that the fluctuation value of the driving speed in the previous cycle is less than the second threshold (NO in S915), the overall controller 300 proceeds with the process to S917. The process of S917 is mentioned later.

When determining that the fluctuation value of the driving speed calculated with the fluctuation-value calculation unit 306 is equal to or more than the first threshold (NO in S912), the overall controller 300 proceeds with the process to S913. The overall controller 300 determines whether the fluctuation value of the driving speed calculated with the fluctuation-value calculation unit 306 is equal to or more than a third threshold in S913. It should be noted that the third threshold is larger than the first threshold and may be equal to the second threshold (twice the instruction speed in the above-mentioned example), for example. When determining that the fluctuation value of the driving speed is equal to or more than the third threshold (YES in S913), the overall controller 300 proceeds with the process to S914. And when determining that the fluctuation value of the driving speed is less than the third threshold (NO in S913), the process proceeds to S917.

The overall controller 300 determines whether the fluctuation value of the driving speed calculated with the fluctuation-value calculation unit 306 in the previous cycle is less than a fourth threshold in S915. When determining that the fluctuation value of the driving speed in the previous cycle is less than the fourth threshold (YES in S914), the overall controller 300 proceeds with the process to S916. And when determining that the fluctuation value of the driving speed is equal to or more than the fourth threshold (NO in S914), the process proceeds to S917. It should be noted that the fourth threshold is smaller than the third threshold and may be equal to the first threshold (0.5 times the instruction speed in the above-mentioned example), for example. In this way, the alternate fluctuations in position and speed to the instruction position in the vibration actuator 100 are detected through the processes of the steps S910 through S916.

The overall controller 300 determines whether the contact member 111 arrives at the target stop position by determining whether a stop instruction generated in the controller 210 is input through predetermined settling time in S917. In more detail, when the predetermined settling time elapses after the instruction position generated with the instruction-position generation unit 301 matches the target stop position, the CPU generates the stop instruction according to a program for executing a settling time elapsing process that is stored in the memory of the controller 210. The overall controller 300 determines whether the stop instruction is input to a program that executes a termination process of one control cycle using a program that determines propriety of continuation of the control cycle. The programs are stored in the memory of the controller 210.

When determining that the stop instruction is not input (NO in S917), the overall controller 300 returns the process to S903. Thereby, the position feedback control by the phase-difference control or the frequency control is repeated for every cycle toward the target stop position. In the meantime, when determining that the stop instruction is input (YES in S917), the overall controller 300 finishes this process (drive of the vibration actuator 100). Although the control method using the driving speed of the contact member 111 is described in the flowchart of FIG. 9, a control method that calculates the fluctuation value using the value directly obtained from the position detection unit 120 and decreases the pulse width in accordance with the fluctuation value may be employed.

Incidentally, when the pulse width is continuously decreased in S915 and S916, the pulse width may enter into the blind zone of the pulse width. In such a case, the fluctuation value of the driving speed may increase or the vibration actuator 100 may stop. Moreover, when the drive load of the vibration actuator 100, environment, etc. vary, the same phenomenon may occur. Accordingly, the fluctuation value of the driving speed may be recorded beforehand, the fluctuation value may be compared before and after decreasing the pulse width in S913 or S915, and the pulse width may be adjusted so that the fluctuation value will become small.

Figure 10A:
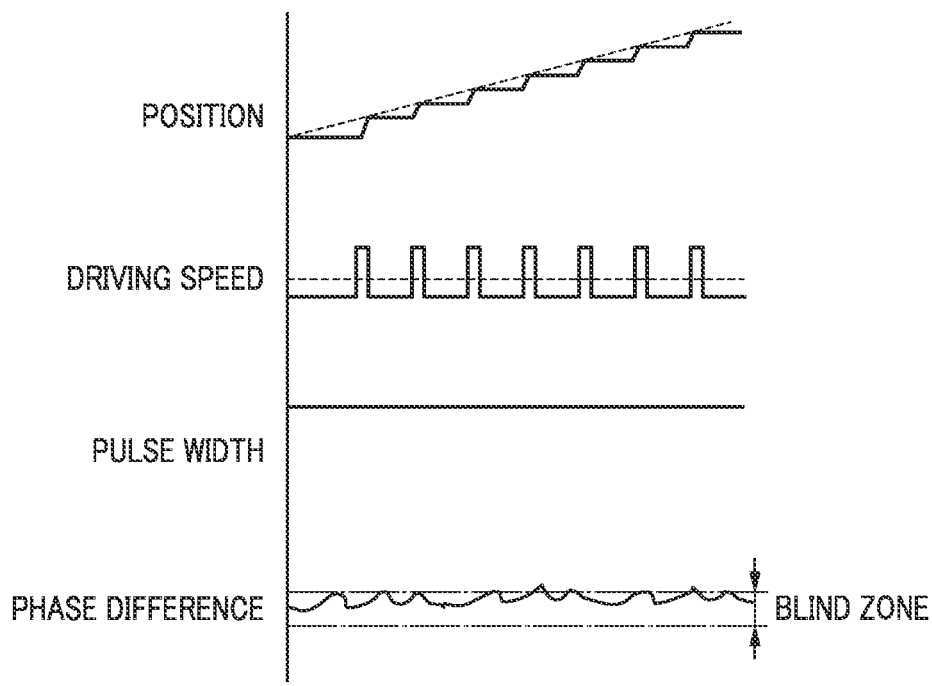
FIG. 10A is a graph showing relation between a position and moving speed of a contact body, pulse width, and phase difference of a case where a control method of a comparative example that is premise of the first embodiment is used.
Figure 10B:
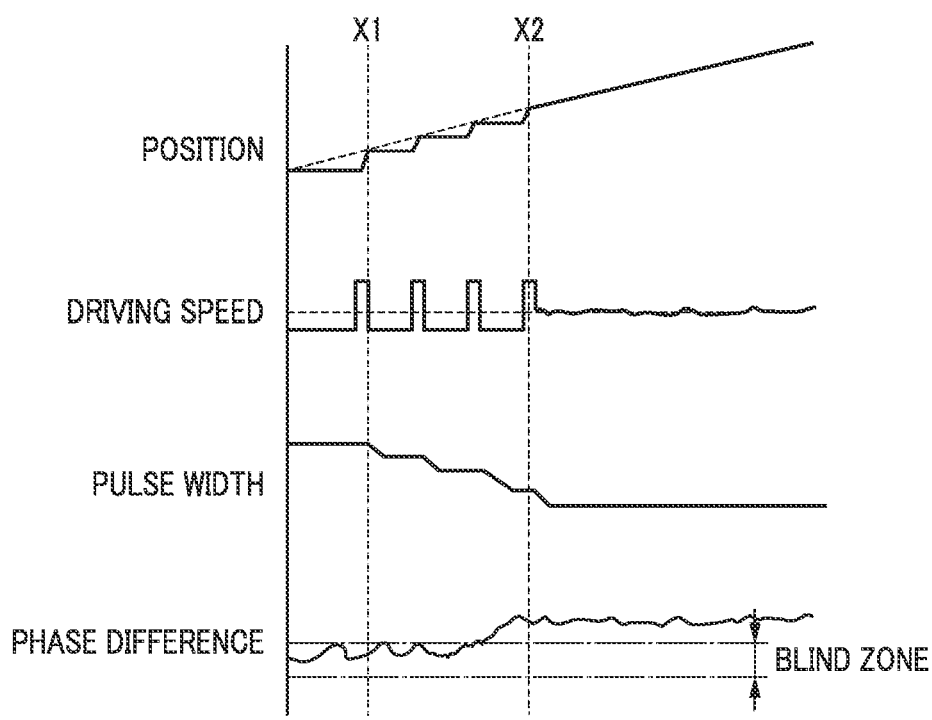
FIG. 10B is a graph showing the relation of a case where the control method of the first embodiment is used.

Effects obtained by the control according to the flowchart of FIG. 9 will be described by referring to FIG. 10A and FIG. 10B. FIG. 10A and FIG. 10B are graphs showing relations between the position and driving speed of the contact member 111 and the pulse width and phase difference of the pulse signals in a case where the vibration actuator 100 is driven. FIG. 10A is the graph describing the control method of a comparative example that is premise of the first embodiment. FIG. 10B is the graph describing the control method of the first embodiment.

In the comparative example, the frequency and phase difference of the drive voltages are set so as to adjust the volume and elliptical ratio of the elliptic movement that is excited in the projections 112 by performing the position feedback control, such as a PID control, in accordance with the deviation between the instruction position, which consists of acceleration, constant speed, and deceleration, and the detected position of the contact member 111. In this case, a phase difference control is mainly performed in accordance with the deviation like the "PHASE DIFFERENCE" in FIG. 10A while keeping the frequency constant in the low speed control.

Since the pulse width has the blind zone in which the vibration actuator 100 does not drive, an initial value of the pulse width is set to a value, such as 20% or 30%, that has a sufficient margin against the blind zone in the comparative example like the "PULSE WIDTH" in FIG. 10A. However, since the absolute value of the deviation is extremely small in the low speed control in which the driving speed is several μm/s, the phase-difference control amount also becomes extremely small. As mentioned above, since there is a blind zone due to static friction force, the vibration actuator 100 does not operate when the phase-difference control amount enters into the blind zone. Accordingly, even if the deviation increases, the vibration actuator 100 does not operate until the phase-difference control amount escapes from the blind zone. Moreover, even if the control amount escapes from the blind zone, the control amount at that time deviates greatly from the inherent control amount. As a result, as shown by the "DRIVING SPEED" in FIG. 10A, the actual driving speed momentarily becomes larger than the driving speed determined by the speed instruction or the position instruction. Since such a sudden operation (movement) and stop are repeated, the alternate fluctuations in position and speed to the instruction position occur, and an abnormal noise occurs on each occasion of sudden operation.

In this embodiment, the frequency and phase difference of the drive voltages are set by performing the position feedback control, such as a PID control, in accordance with the deviation between the instruction position, which consists of acceleration, constant speed, and deceleration, and the detected position of the contact member 111 as well as the comparative example. As mentioned above, when the alternate fluctuations in position and speed are detected, the control method of this embodiment controls so as to decrease the pulse width of the pulse signals. That is, the phase difference is adjusted in accordance with the control amount based on the deviation.

In the example of FIG. 10B, when the alternate fluctuations of "POSITION" and "DRIVING SPEED" are detected at a timing X1, the pulse width of the pulse signals is decreased step by step whenever the fluctuations are detected as shown by the "PULSE WIDTH". It should be noted that the pulse width may be gradually decreased at constant inclination (like a linear function) instead of the decrease step by step. The control amount increases because the pulse width decreases and the driving force decreases. That is, the phase-difference control amount increases as shown by the "PHASE DIFFERENCE" in FIG. 10B and escapes from the blind zone. Thereby, as shown by the "POSITION" and "DRIVING SPEED" in FIG. 10B, the occurrence of the alternate fluctuations in position and speed is reduced after a timing X2. This improves the controllability in the low speed driving and reduces the occurrence of the abnormal noise owing to the sudden driving.

Figure 11:
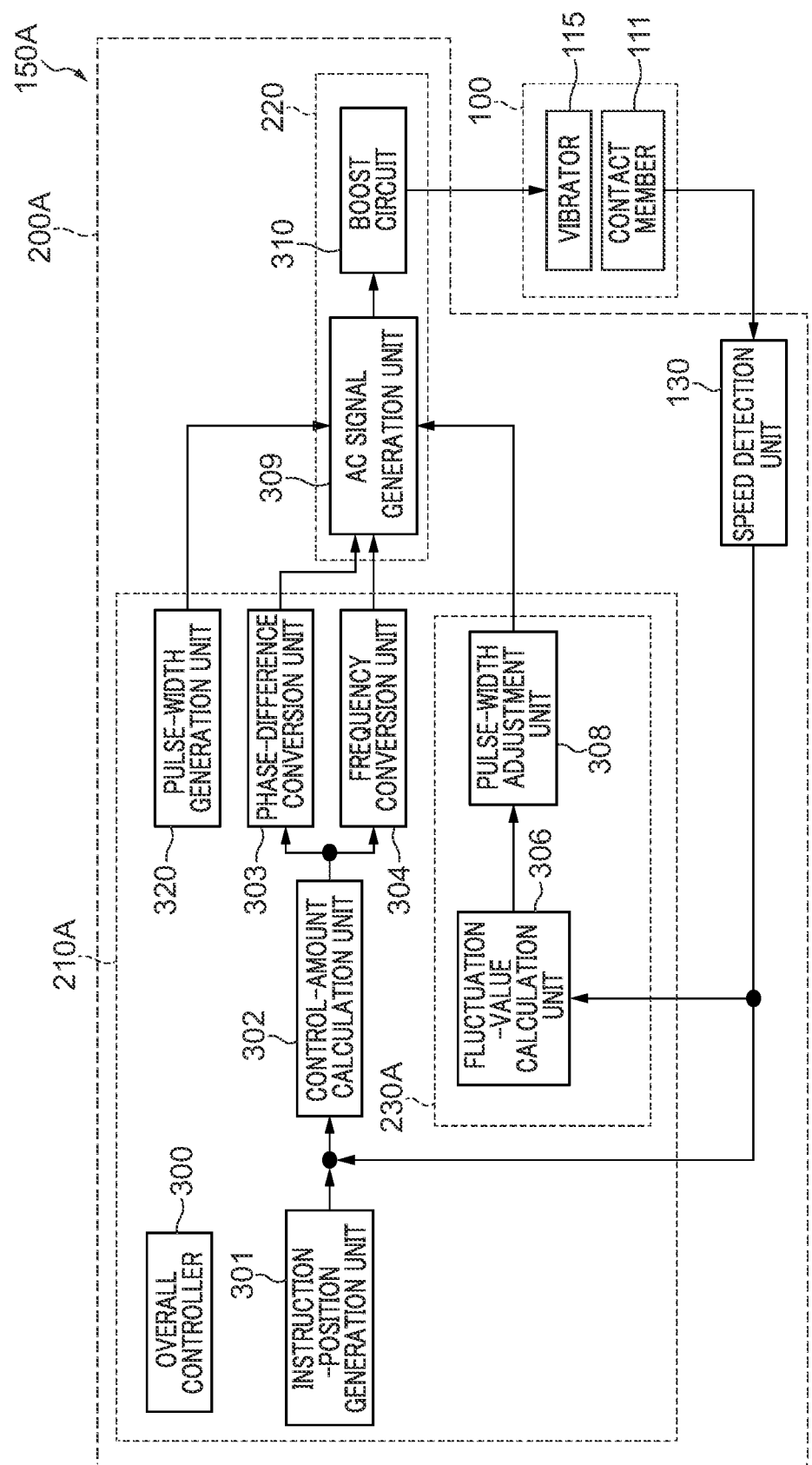
FIG. 11 is a block diagram showing a modified example of the vibration driving device of FIG. 1.

Although the control device 200 that performs the position feedback control using the output of the position detection unit 120 has been described up to here, a control method by speed feedback may be employed. FIG. 11 is a block diagram showing a schematic configuration of a vibration driving device 150A that has a control device 200A that performs speed feedback control. The vibration driving device 150A is one of modified examples of the vibration driving device 150. In FIG. 11, the same reference numerals are applied to components of the control device 200A that are identical to the components of the control device 200 (FIG. 1) and duplicated descriptions are omitted.

The control device 200A is constituted by a controller 210A, the drive unit 220, and a speed detection unit 130. Although the control device 200 is provided with the instruction-position generation unit 301 and the feature control unit 230, the controller 210A is provided with an instruction-speed generation unit 350 and a feature control unit 230A instead. The other configurations of the control device 200A are the same as that of the control device 200. The feature control unit 230A is different from the feature control unit 230 on a point that the speed calculation unit 305 is not provided.

In the control device 200A, the control-amount calculation unit 302 calculates a control amount on the basis of the deviation between the relative moving speed of the vibrator 115 and contact member 111 detected by the speed detection unit 130 and the instruction speed generated from the instruction-speed generation unit 350. The control amount calculated by the control-amount calculation unit 302 is converted into phase difference and frequency, and the phase difference and frequency are output to the AC signal generation unit 309.

Next, a second embodiment of the present invention will be described. Although the control method of the first embodiment decreases the pulse width of the pulse signals for generating the drive voltages V1 and V2 when the alternate fluctuations in position and speed are detected, a control method of the second embodiment raises the frequency of the pulse signals.

Figure 12:
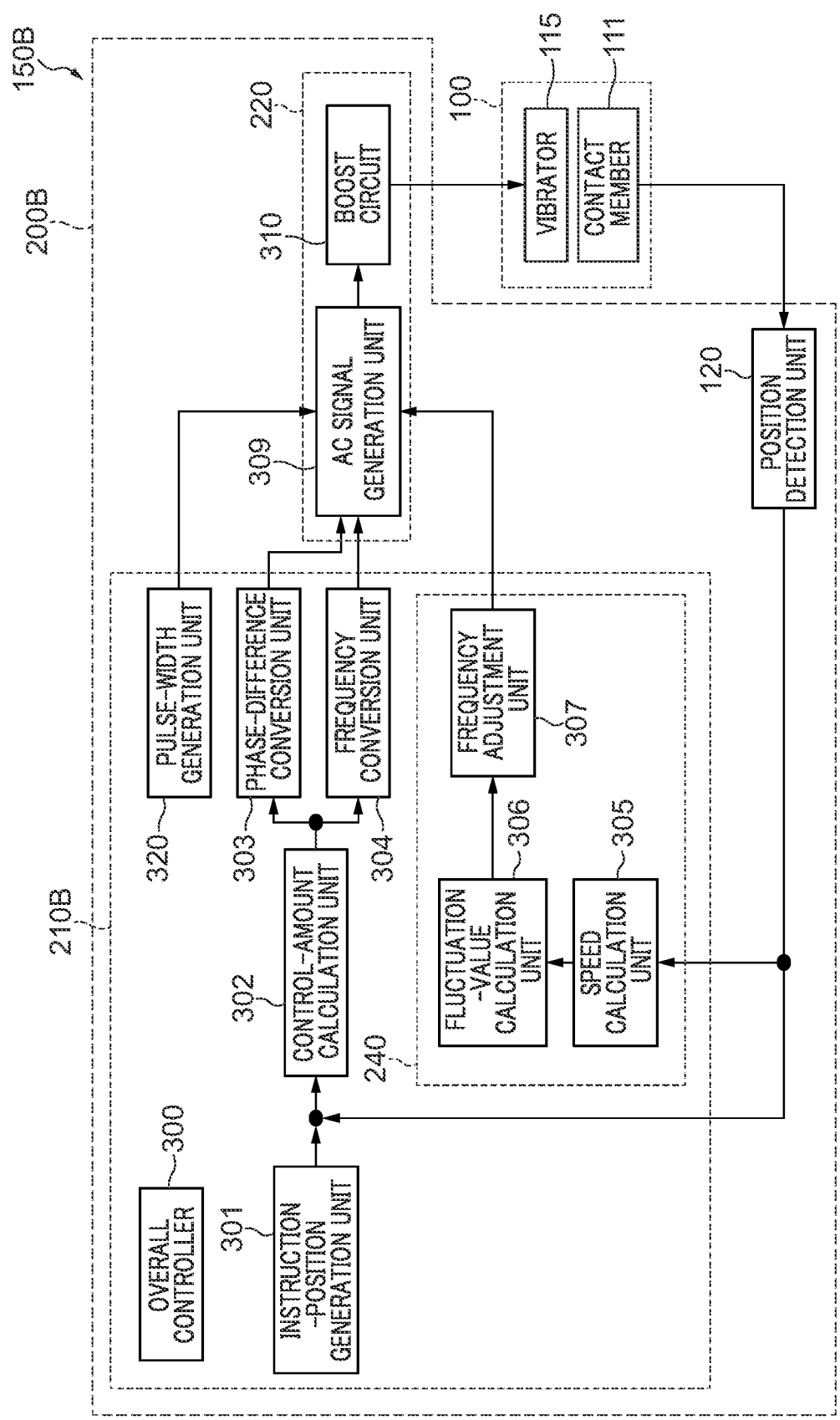
FIG. 12 is a block diagram showing a schematic configuration of a vibration driving device according to a second embodiment.

FIG. 12 is a block diagram showing a schematic configuration of a vibration driving device 150 according to the second embodiment. In FIG. 12, the same reference numerals are applied to components of the control device 200B that are identical to the components of the control device 200 (FIG. 1) and duplicated descriptions are omitted.

The control device 200B is constituted by a controller 210B, a controller 210B, the drive unit 220, and the position detection unit 120. The controller 210B is provided with a feature control unit 240 instead of the feature control unit 230 of the controller 210. The feature control unit 240 is provided with a frequency adjustment unit 307 instead of the pulse-width adjustment unit 308 of the feature control unit 230. The other configurations of the controller 210B are the same as that of the controller 210.

The frequency adjustment unit 307 constituting the feature control unit 240 adjusts so as to raise the frequency of the pulse signals when the calculation value obtained from the fluctuation-value calculation unit 306 becomes alternative. As described in the first embodiment, since influence of the blind zone is small when the contact member 111 is driven at a high speed, the calculation value obtained from the fluctuation-value calculation unit 306 is hard to become alternative. Accordingly, a value output from the frequency adjustment unit 307 becomes 0 (zero). In the meantime, since the fluctuation value obtained from the fluctuation-value calculation unit 306 becomes alternative because of the influence of the blind zone when the contact member 111 is driven at a low speed. In such a case, the frequency adjustment unit 307 adjusts the frequency of the pulse signals on the basis of the obtained fluctuation value. The output signals from the phase-difference conversion unit 303, frequency conversion unit 304, pulse-width generation unit 320, and frequency adjustment unit 307 are input into the AC signal generation unit 309.

Figure 13:
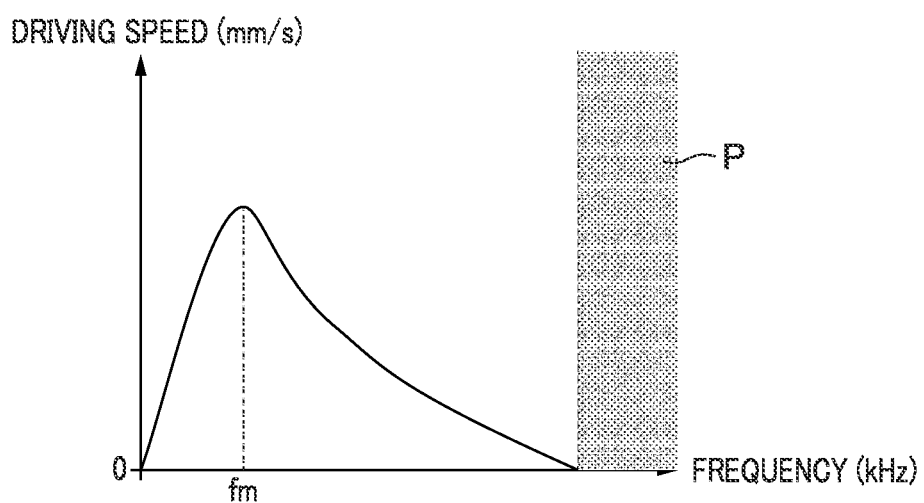
FIG. 13 is a graph describing frequency of a blind zone of a vibration actuator.

FIG. 13 is a graph showing relation between the frequency of the drive voltages V1 and V2 applied to the piezoelectric device 114 of the vibration actuator 100 and the driving speed of the contact member 111. When the frequency of the drive voltages V1 and V2 is changed, i.e., when the frequency of the pulse signals is changed while keeping the pulse width and phase difference constant, the driving speed changes in response to the change of the frequency according to predetermined relationship. The amplitude (Z-direction amplitude) of the vibration of the A-mode becomes larger when the frequency of the drive voltages V1 and V2 approaches the resonance frequency fm. And the Z-direction amplitude becomes smaller as the frequency goes away from the resonance frequency fm.

The driving speed depends on the amplitude of the vibration of the A-mode. In the blind zone P in which the driving force of the vibration actuator 100 becomes smaller than the frictional force between the projections 112 of the vibrator 115 and the contact surface of the contact member 111, the vibration actuator 100 is in the stopped state. As described in the first embodiment, the range of the blind zone P fluctuates in accordance with the factors, such as the drive performance of the vibration actuator 100, drive load, and environment.

Figure 14A:
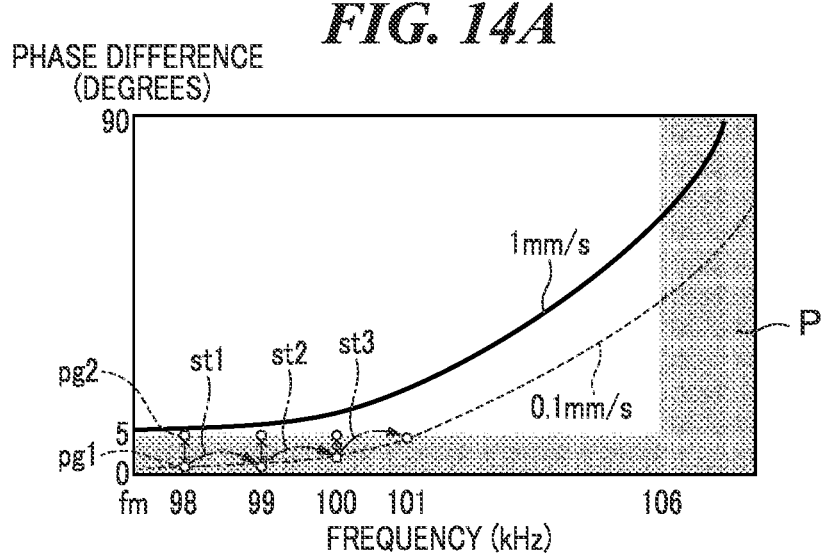
FIG. 14A, FIG. 14B, and FIG. 14C are graphs each of which shows relation between the frequency and phase difference of the pulse signal at the predetermined driving speeds.
Figure 14B:
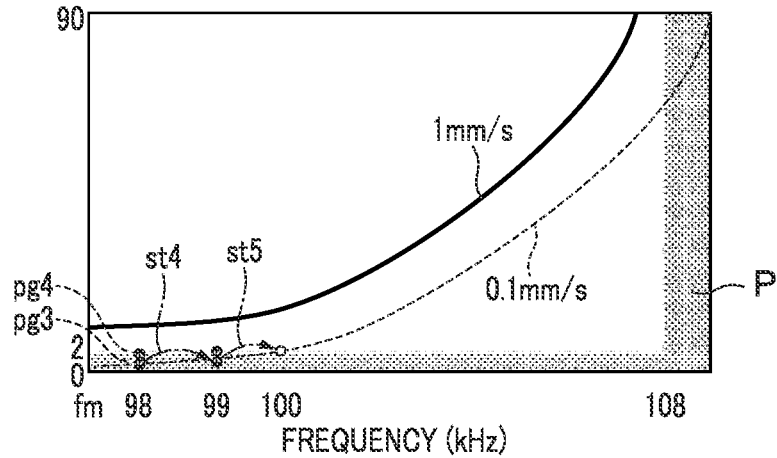
Figure 14C:
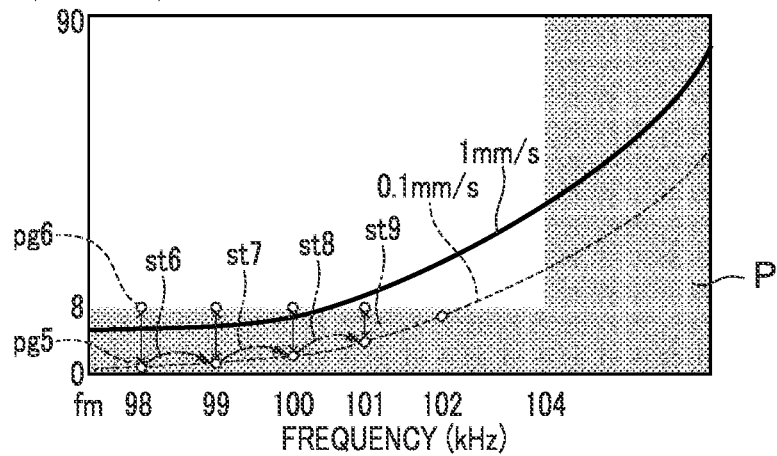

FIG. 14A, FIG. 14B, and FIG. 14C are graphs each of which shows relation between the frequency and phase difference at the predetermined driving speeds. In FIG. 14A, when the contact member 111 is driven at the driving speed of 1 mm/s that is indicated by a solid line, when the initial value of the frequency is set in a range between 98 kHz and 106 kHz in order to avoid the blind zone, the drive is controllable without any problem. However, when the diving speed is 0.1 mm/s that is indicated by a broken line, if the initial value of the frequency is set in a range between 98 kHz and 106 kHz, the vibration actuator 100 does not operate, because the phase difference is controlled in the blind zone P. For example, if the initial value of the frequency is set to 98 kHz at 0.1 mm/s, the frequency and phase difference are set to the values at a point pg1. However, the vibration actuator 100 does not operate in this condition. Accordingly, since the control amount output from the control-amount calculation unit 302 increases, the value of the phase difference is shifted from pg1 to pg2 (pg2 >pg1). When the value of the phase difference becomes pg2, although the vibration actuator 100 starts an operation because of escaping from the blind zone P, it operates at a driving speed faster than the target driving speed. As a result, since the value of the phase difference is shifted to pg1 again to decrease the driving speed, it goes into the blind zone P again, and the vibration actuator 100 stops. In this way, the alternate fluctuations in position and speed occur.

In order to solve the problem, the frequency is increased when the alternate fluctuations in position and speed are detected in this embodiment. For example, when the initial value of the frequency of the pulse signals is set to 98 kHz and the control is started at the driving speed of 0.1 mm/s, the alternate fluctuations in position and speed occur as mentioned above. When the fluctuations are detected, the frequency is increased from 98 kHz to 99 kHz (shifts to higher frequency) as indicated by an arrow st1 in FIG. 14. When the alternate fluctuations in position and speed are detected also after changing the frequency, the frequency is further increased. In this way, the control that increases the frequency is repeated whenever the alternate fluctuations in position and speed are detected until the fluctuations are no longer detected. In FIG. 14A, the control at the target driving speed (0.1 mm/s) becomes available by escaping from the blind zone when the frequency is increased to 10 kHz through the shifts indicated by arrows st2 and st3.

The increasing amount of the frequency required to escape from the blind zone P depends on the drive loads of the vibration actuator 100. For example, when the drive load is small, the blind zone P becomes narrow as shown in FIG. 14B. In the example of FIG. 14B, when the alternate fluctuations in position and speed are detected in the control at the driving speed of 0.1 mm/s, the frequency of the pulse signals is increased from 98 kHz to 99 kHz as indicated by an arrow st4. Since the control that increases the frequency is repeated whenever the alternate fluctuations in position and speed are detected until the fluctuations are no longer detected, the control at the target driving speed becomes available by escaping from the blind zone P when the frequency of the pulse signals is increased to 100 kHz as indicated by an arrow st5.

Moreover, the increasing amount of the frequency required to escape from the blind zone P depends on the drive load and arrangement environment of the vibration actuator 100. For example, the blind zone P becomes larger under the environment of heat and high humidity as shown in FIG. 14C. In this example, when the alternate fluctuations in position and speed are detected in the control at the driving speed of 0.1 mm/s, the frequency is repeatedly increased as indicated by arrows st6, st7, st8, and st9. In this case, the control at the target driving speed becomes available by escaping from the blind zone P when the frequency is increased to 102 kHz.

Figure 15:
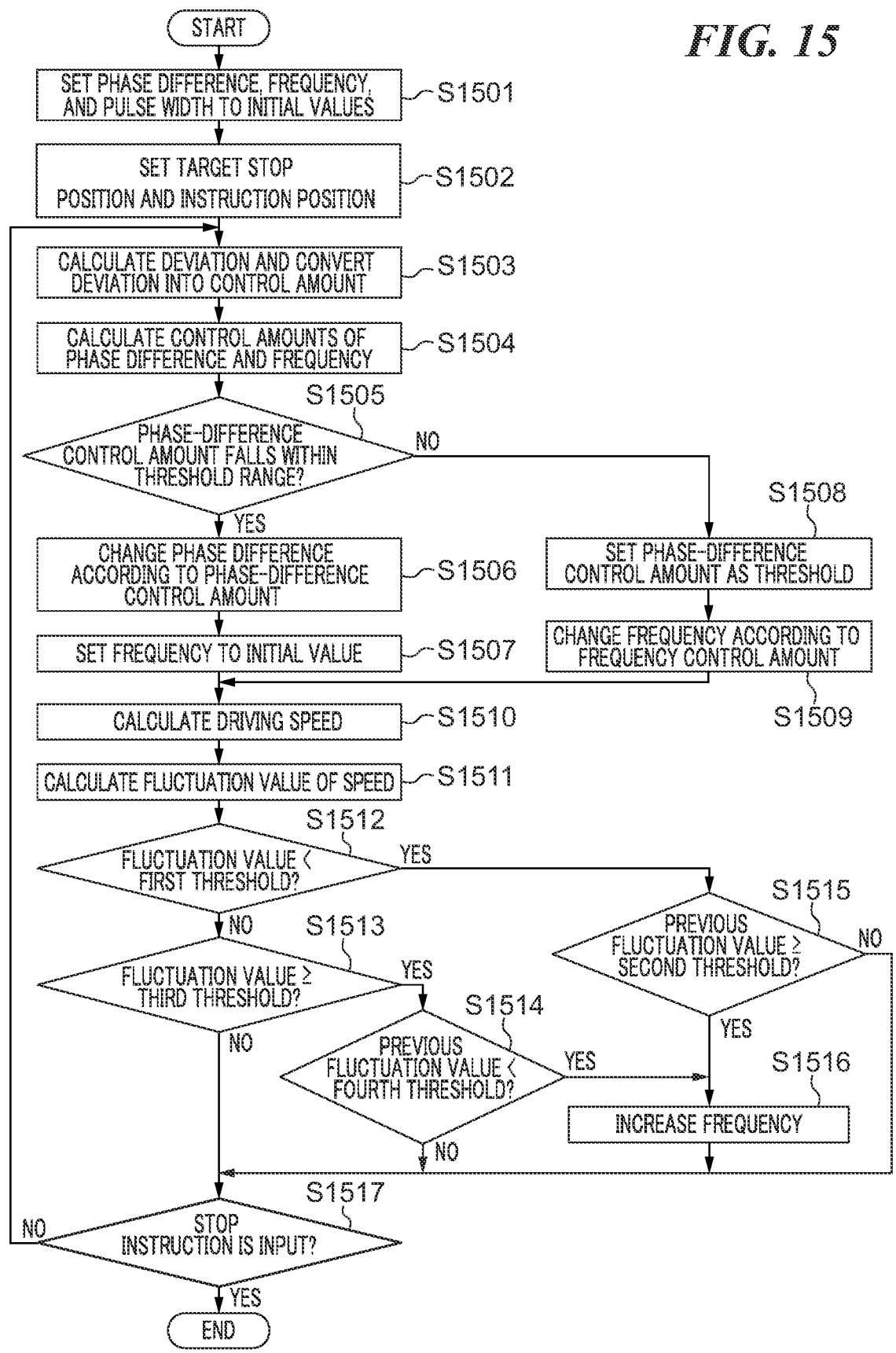
FIG. 15 is a flowchart describing a control method for the vibration driving device of FIG. 12.

FIG. 15 is a flowchart describing a control method for a vibration driving device 150B in FIG. 12. Each process (step) indicated by an S-number in the flowchart of FIG. 15 is achieved because the controller 210 (CPU) controls operations of the respective function blocks constituting the control device 200 by developing and running a predetermined program stored in the memory.

Since processes of S1501 through S1515 and S1517 are the same as that of S901 through S915 and S917 of the flowchart in FIG. 9, descriptions thereof are omitted in the following description. The frequency adjustment unit 307 increases the frequency of the pulse signals in S1516. When the frequency of the pulse signals is repeatedly increased in S1516, the vibration actuator 100 may stop because the phase difference may enter into the blind zone P and the fluctuation value of the driving speed may increase. Moreover, when the drive load of the vibration actuator 100, environment, etc. vary, the same phenomenon may occur. Accordingly, the fluctuation value of the driving speed may be recorded beforehand, the fluctuation value may be compared before and after increasing the frequency in S1513 or S1515, and the frequency may be adjusted so that the fluctuation value will become small.

Although the control method using the driving speed of the contact member 111 is described in the flowchart of FIG. 15, a control method that calculates the fluctuation value using the value directly obtained from the position detection unit 120 and increases the frequency of the pulse signals in accordance with the fluctuation value may be employed.

Figure 16A:
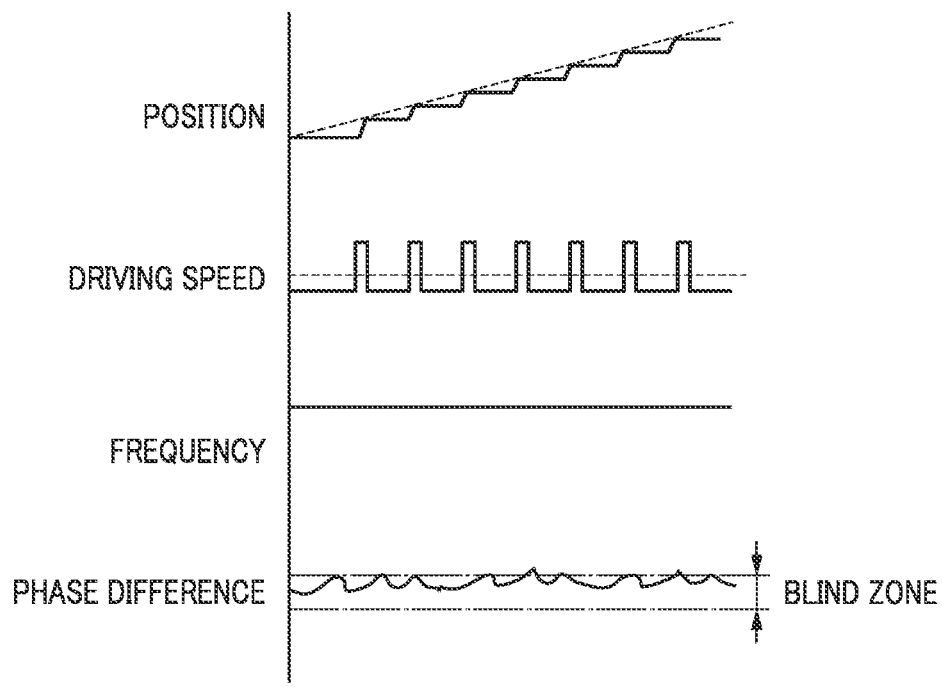
FIG. 16A is a graph showing relation between a position and moving speed of a contact body, pulse width, and phase difference of the case where the control method of the comparative example is used.
Figure 16B:
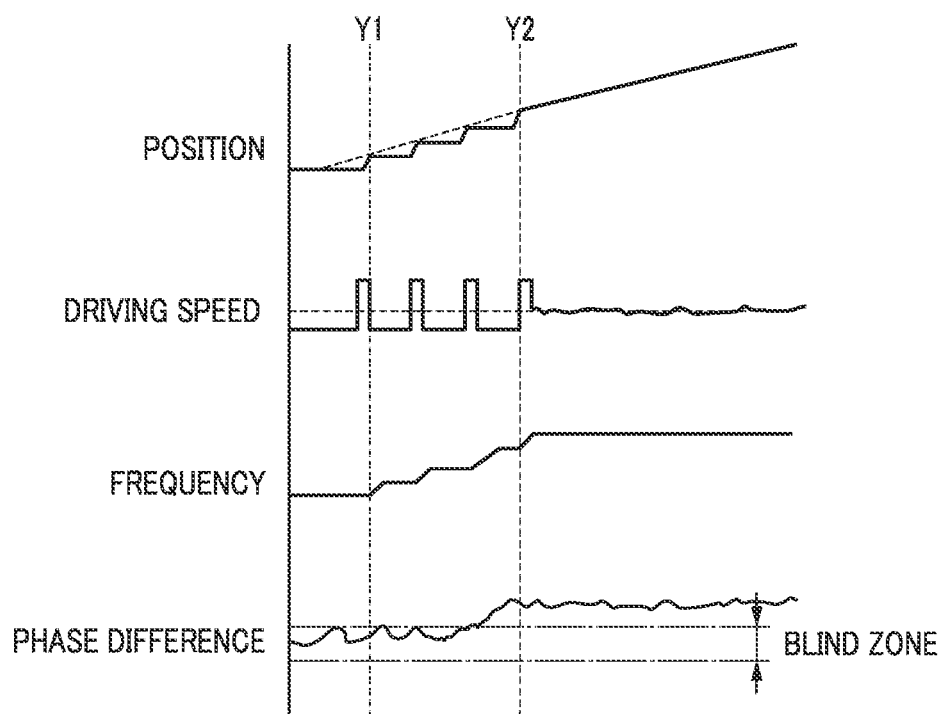
FIG. 16B is a graph showing the relation of a case where the control method of the second embodiment is used.

Effects obtained by the control according to the flowchart of FIG. 15 will be described by referring to FIG. 16A and FIG. 16B. It should be noted that the vibration actuator 100 shall be constituted so that the contact member 111 will move against the fixed vibrator 115 in the following description. FIG. 16A and FIG. 16B are graphs showing relations between the position and driving speed of the contact member 111 and the pulse width and phase difference of the pulse signals in a case where the vibration actuator 100 is driven. FIG. 16A is the graph describing the control method of a comparative example. FIG. 10B is the graph describing the control method of the second embodiment.

Although the control of the comparative example of FIG. 16A keeps the frequency of the pulse signals constant and differs from the previous comparative example of FIG. 10A that keeps the pulse width constant, the alternate fluctuations in position and speed are detected continuously at the time of starting drive as a result. Since the control of the comparative example that keeps the frequency constant has been already described, more detailed description is omitted.

In this embodiment, the drive frequency and phase difference of the AC pulse signals are set by performing the position feedback control, such as a PID control, in accordance with the deviation between the instruction position, which consists of acceleration, constant speed, and deceleration, and the detected position of the contact member 111 as well as the comparative example. Since the deviation is small in the low speed driving, an initial value of the frequency of the pulse signals that determines the frequency of the drive voltages V1 and V2 is set to a value in a predetermined range between the resonance frequency and the blind zone P, for example. Then, when the alternate fluctuations in position and speed are detected, the frequency is increased.

Specifically, although the phase difference is adjusted using the control amount corresponding to the deviation as shown by the "PHASE DIFFERENCE" in FIG. 16B, the frequency of the pulse signals is increased step by step whenever the alternate fluctuations in position and speed are detected after a timing Y1 as shown by the "FREQUENCY". The frequency may be gradually increased at constant inclination (like a linear function) instead of the increase step by step. When the driving force becomes small as the frequency increases, the control amount decreases and the phase-difference control amount increases. As a result, the phase difference escapes from the blind zone as shown by the "PHASE DIFFERENCE" in FIG. 16B. Thereby, as shown by the "POSITION" and "DRIVING SPEED" in FIG. 16B, since the drive is controllable while avoiding the blind zone of the phase difference to the driving speed after the timing Y2, the alternate fluctuations in position and speed are reduced. In this way, the controllability is improved and occurrence of abnormal noise is reduced as a result.

In the first embodiment and second embodiment, a certain period may be required from the timings X1 and Y1 at which the alternate fluctuations in position and speed are detected until the timing X2 and Y2 at which the fluctuations are reduced shown in FIG. 10B and FIG. 16B. In that case, when the pulse width is decreased as shown by the "PULSE WIDTH" in FIG. 10B or when the frequency is increased as shown by the "FREQUENCY" in FIG. 16, a control gain of the phase difference may be increased. The increase of the control gain is preferably continued during change of the pulse width or the frequency or until the phase difference escapes from the blind zone. An amount of increase may be constant or may depend on the change amount of the pulse width or the frequency. When the control gain is increased, the phase-difference control amount to the deviation increases, which enables rapid escape from the blind zone and shorten a period until reducing occurrence of abnormal noise.

Moreover, as mentioned above, the initial values of parameters, such as pulse width and frequency, vary according to various factors, such as posture of the vibration actuator 100, drive load, environment. Accordingly, the initial values of the parameters may be set on the basis of table data prepared beforehand using detected results, such as posture detected with a gyro sensor and an acceleration sensor, temperature and humidity detected with a temperature humidity sensor.

Furthermore, whenever the drive control is performed, the controller 210 may be controlled to learn dynamic conditions, such as the drive load of the vibration actuator 100 and environment. In that case, the controller 210 stores the conditions during driving into the memory as learning data. When the device is used under the same or similar conditions, the controller 210 reads the corresponding data and sets the initial values of the parameters using the read data. Thereby, the effect that reduces occurrence of the alternate fluctuations in position and speed is improved.

Figure 17:
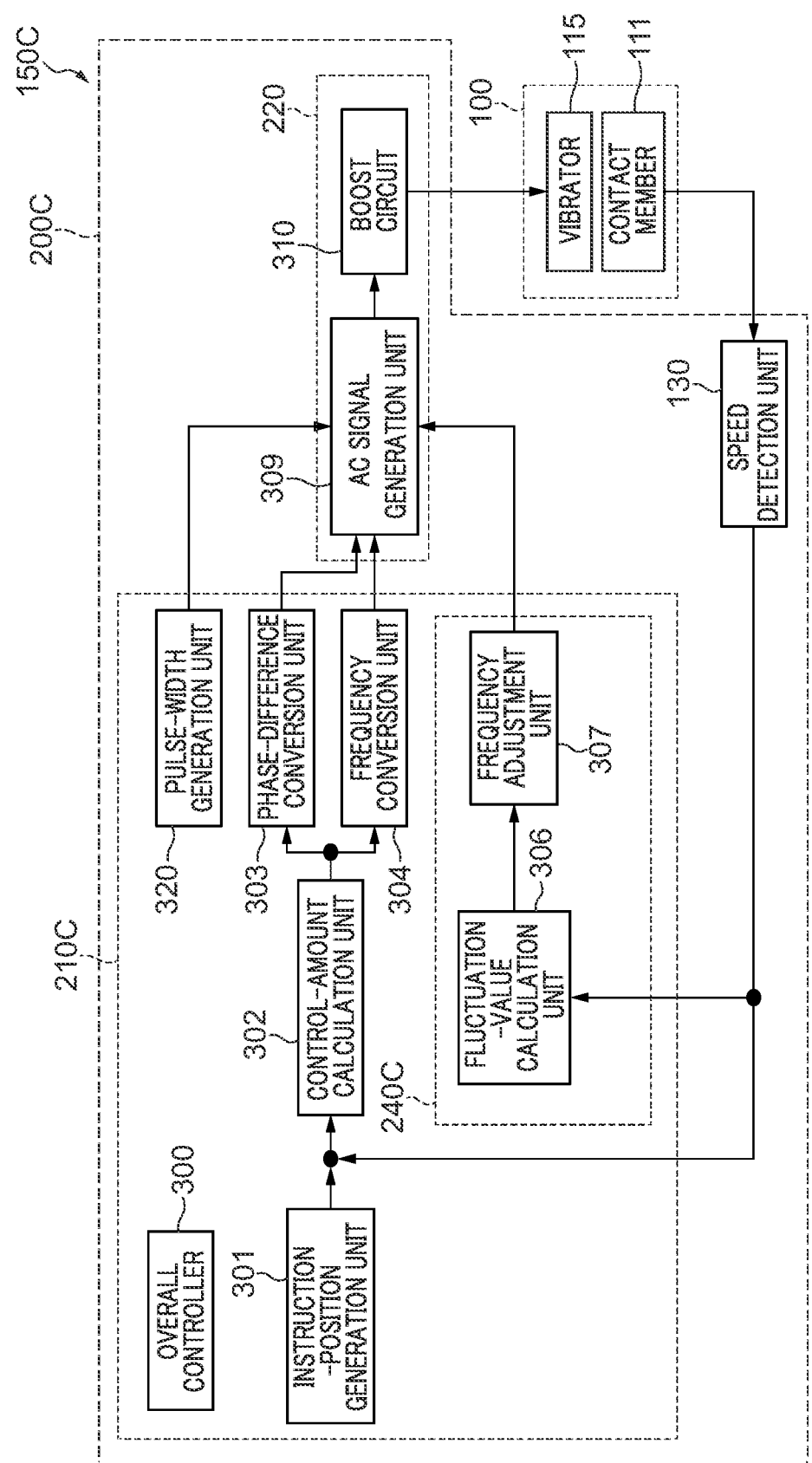
FIG. 17 is a block diagram showing a modified example of the vibration driving device of FIG. 12.

Although the control device 200B that performs the position feedback control using the output of the position detection unit 120 has been described up to here, a control method by speed feedback may be employed. FIG. 17 is a block diagram showing a schematic configuration of a vibration driving device 150C that has a control device 200C that performs speed feedback control. The vibration driving device 150C is one of modified examples of the vibration driving device 150B. In FIG. 17, the same reference numerals are applied to components of the control device 200C that are identical to the components of the control device 200B (FIG. 12) and duplicated descriptions are omitted.

The control device 200C is constituted by a controller 210C, the drive unit 220, and the speed detection unit 130. The controller 210C is provided with the instruction-speed generation unit 350 and a feature control unit 240C instead of the instruction-position generation unit 301 and the feature control unit 240 of the controller 210B. The other configurations of the controller 210C are the same as that of the controller 210B. The feature control unit 240C is different from the feature control unit 240 on a point that the speed calculation unit 305 is not provided.

In the control device 200C, the control-amount calculation unit 302 calculates a control amount on the basis of the deviation between the relative moving speed of the vibrator 115 and contact member 111 detected by the speed detection unit 130 and the instruction speed generated from the instruction-speed generation unit 350. The control amount calculated by the control-amount calculation unit 302 is converted into phase difference and frequency, and the phase difference and frequency are output to the AC signal generation unit 309. It should be noted that the output signal (detected moving speed of the contact member 111) of the speed detection unit 130 is input into the fluctuation-value calculation unit 306.

As described in the first and second embodiment, when the alternate fluctuations in position and speed are detected, the vibration driving device of the present invention automatically adjusts the combination of the control parameters while avoiding the blind zone of the control parameters that varies in accordance with the drive load of the vibration actuator and environment. This reduces occurrence of the alternate fluctuations in position and speed. As a result, the controllability in the low speed driving is improved and occurrence of abnormal noise due to the sudden driving is reduced.

Figure 18:
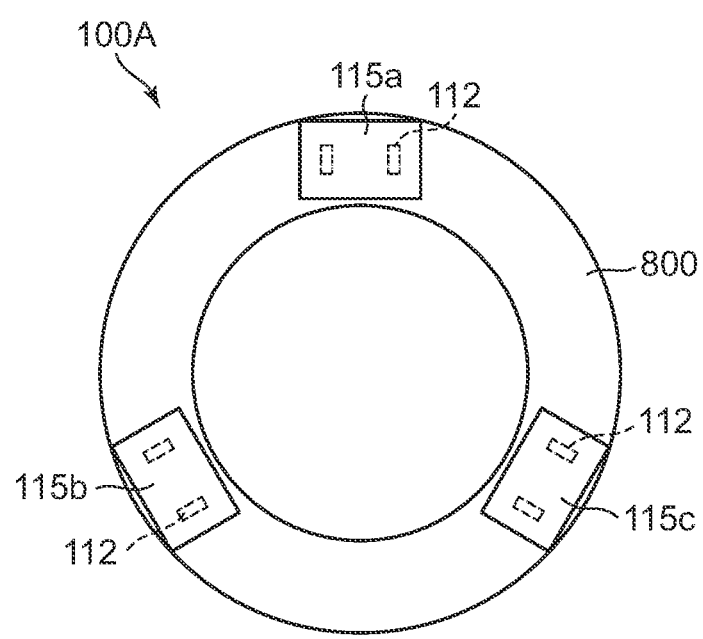
FIG. 18 is a plan view showing a schematic configuration of a vibration actuator according to a third embodiment.

Next, a third embodiment will be described. In the third embodiment, a vibration actuator 100A that is controlled by the control device 200 is described. FIG. 18 is a plan view showing a schematic configuration of the vibration actuator 100A. The vibration actuator 100A has an annular contact member 800 and three vibrators 115a, 115b, and 115c, which are arranged on the contact member 800 at approximately equal intervals in a circumferential direction of the contact member 800. Since a configuration of each of the vibrators 115a, 115b, and 115c is the same as that of the vibrator 115 described in the first embodiment, the detailed description about the configuration is omitted.

Each of the vibrators 115a, 115b, and 115c is arranged on a base (not shown) so that a straight line that connects the centers of the two projections 112 will become a tangent to a concentric circle of an inner periphery (or an outer periphery) of the contact member 800. Thereby, when vibrations of the A-mode and B-mode are simultaneously excited in the vibrators 115a, 115b, and 115c, the contact member 800 is driven and rotates (or the vibrators 115a, 115b, and 115c are rotated relatively to the contact member 800). Although the vibration actuator 100A has the three vibrators 115a, 115b, and 115c, the number of the vibrators is not restricted to three. One, two, four or more vibrators may be employed.

Figure 19:
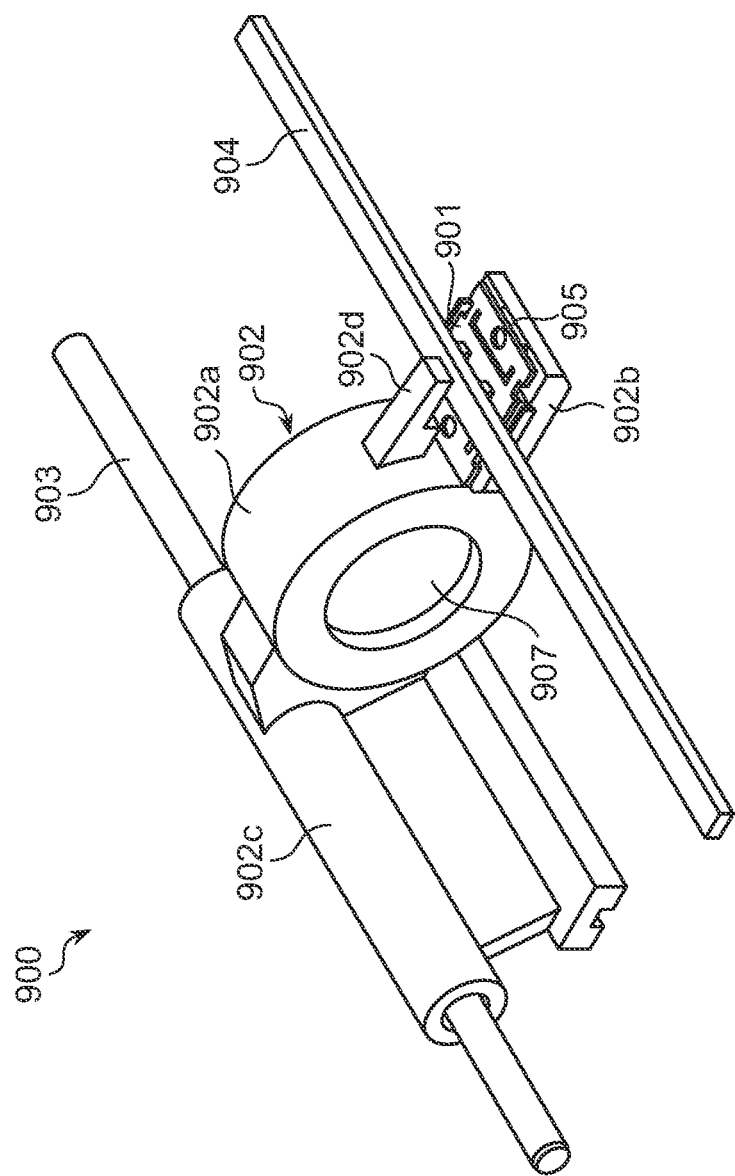
FIG. 19 is a perspective view showing a schematic configuration of a lens driving apparatus of a fourth embodiment.

Next, a fourth embodiment will be described. In the fourth embodiment, a configuration that applies the vibration driving device 150 to a lens driving mechanism of an image pickup apparatus (an optical apparatus) is described. FIG. 19 is a perspective view showing a schematic structure of a lens driving mechanism 900 mounted in a lens barrel that the image pickup apparatus provides. It should be noted that illustration of the control device 200 is omitted.

The lens driving mechanism 900 is provided with a lens holder 902, a vibrator 901 that drives the lens holder 902, a pressure magnet 905, a first guide bar 903, a second guide bar 904, and a base (not shown).

The lens holder 902 has a cylindrical body 902a, a holding member 902b that holds the vibrator 901 and pressure magnet 905, a first guide 902c that forms a first guide by fitting the first guide bar 903, and a drop prevention part 902d. A lens 907 is held by the body 902a. The first guide bar 903 and second guide bar 904 are arranged in parallel mutually, and respective both ends of the first guide bar 903 and second guide bar 904 are fixed to the base. It should be noted that the lens 907 is a focusing lens performing an automatic focusing operation.

The pressure magnet 905 that constitutes a pressure mechanism consists of a permanent magnet and two yokes arranged at both sides of the permanent magnet. A magnetic circuit is formed between the pressure magnet 905 and the second guide bar 904, and a magnetic attraction force occurs between these members. Thereby, the vibrator 901 is held in a state where tips of two projections provided on the vibrator 901 is pressed to the second guide bar 904 by predetermined force, and a second guide is formed. The second guide bar 904 corresponds to the contact member 111 shown in FIG. 2A.

There is a certain gap between the pressure magnet 905 and the second guide bar 904. Accordingly, when a second guide receives external force, the projections of the vibrator 901 may be separated from the second guide bar 904. In such a case, the drop prevention part 902d provided in the lens holder 902 abuts to the second guide bar 904, and the holding member 902b of the lens holder 902 returns to an inherent position by the magnetic force. In this way, the projections of the vibrator 901 abut to the second guide bar 904.

The vibrator 901 has a configuration equivalent to the vibrator 115 described in the first embodiment, and the detailed description about the configuration is omitted. When the two-phase driving voltages are applied to the piezoelectric device of the vibrator 901, elliptic oscillations are generated in the two projections, which generates friction driving force between the vibrator 901 and the second guide bar 904. Since the first guide bar 903 and second guide bar 904 are fixed, the generated friction driving force moves the lens holder 902 along the first guide bar 903 and the second guide bar 904. In this way, the automatic focusing operation is performed by adjusting the position of the lens 907.

Although the pressure mechanism of the lens driving mechanism 900 uses the magnetic force of the pressure magnet 905, the pressure mechanism may use energization force of a spring. Moreover, although the lens driving mechanism 900 is constituted as a linear vibration driving device, it may be constituted as a rotary lens driving mechanism using the vibration actuator 100A described in the third embodiment. That is, an annular member that holds a lens is rotated by rotational force of a contact member, and the rotation of the annular member is converted into linear movement in an optical axis direction using engagement of a cam pin and a cam groove. Thereby, the lens is moved in the optical axis direction.

Although the vibration driving device is suitable for driving a focusing lens in an image pickup apparatus, it is able to drive a zooming lens by the same configuration. Moreover, the vibration driving device is available to a mechanism that drives a lens or an image sensor for image stabilization.

Figure 20:
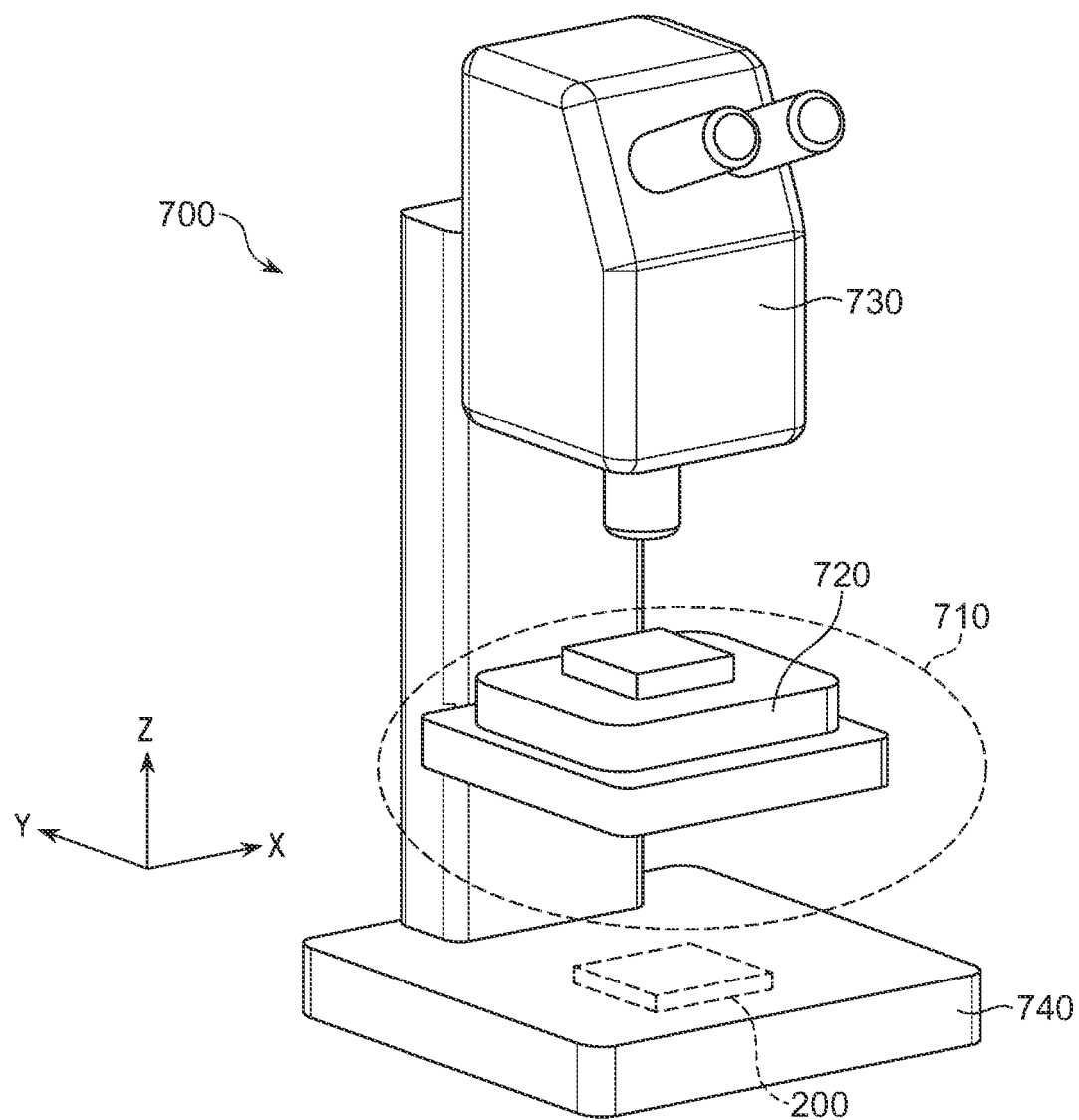
FIG. 20 is an external perspective view showing a microscope of a fifth embodiment.

Next, a fifth embodiment will be described. In the fifth embodiment, a microscope as an example of an apparatus that applies the vibration driving device 150 to positioning of a stage on which an observation object is placed is described. FIG. 20 is an external perspective view of the microscope 700 equipped with the vibration driving device 150. The microscope 700 is provided with an image pickup unit 730 that incorporates an image sensor and an optical system, an automatic stage unit 710 that has a stage 720 being movable in an X-Y plane on a base. The stage 720 corresponds to the contact member 111. The vibrators 115 are not shown in FIG. 20.

Although the control device 200 that constitutes the vibration driving device 150 is arranged in a base plate 740, it may be provided in the image pickup unit 730. At least two vibrators 115 that constitute the vibration actuator 100 (not shown) are used. At least one vibrator 115 is used to drive the stage 720 in the X-direction and is arranged so that the X-direction of the vibrator 115 will match the X-direction of the stage 720. Moreover, other at least one vibrator 115 is used to drive the stage 720 in the Y-direction and is arranged so that the X-direction of the vibrator 115 will match the Y-direction of the stage 720.

A user places an observation target on a surface of the stage 720. When an observation area is wide, the user drives the automatic stage unit 710 to move the observation target together with the stage 720 in the X-direction and Y-direction. The user picks up an enlarged image at every stop position of the stage. Thereby, when many picked-up images are combined by image processing with a computer (not shown), a high definition image that covers the wide observation area can be obtained.

It should be noted that apparatuses and devices to which the vibration driving device 150 is applied are not limited to the apparatuses and devices according to the third, fourth, and fifth embodiments mentioned above. The vibration driving device 150 is widely applicable to apparatuses and devices equipped with a component that is moved or is positioned by the drive of the vibration actuator 100.

Although the present invention has been described in detail on the basis of the suitable embodiment, the present invention is not limited to these specific embodiments, and various configurations that do not deviate from the gist of the present invention are also included in the present invention.

Moreover, the configuration (electronic parts, electric part, etc.) of the control device 200 is not limited as long as the above-mentioned functions are available. Furthermore, although the configuration driven with the two-phase drive voltages V1 and V2 is described as the vibrator 115, the vibrator may be driven with AC voltages of more than three phases. The control device 200 can be constituted corresponding to the configuration of the vibrator using a well-known technique.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-105643, filed Jun. 18, 2020, which is hereby incorporated by reference herein in its entirety.

What is claimed is:

1. A vibration driving device comprising:
a vibration actuator comprising:
a vibrator that has an elastic member and an electro-mechanical energy conversion element;
a contact member that contacts the vibrator; and
a control device that controls drive of the vibration actuator, the control device comprising:
a speed detection unit configured to detect speed information showing relative speed of the vibrator and the contact member; and
an adjustment unit configured to decrease amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator.

2. The vibration driving device according to claim 1, wherein the adjustment unit decreases the amplitude of the vibration excited in the vibrator until the relative speed becomes the target driving speed.

3. The vibration driving device according to claim 1, wherein the adjustment unit decreases the amplitude of the vibration excited in the vibrator in a direction that intersects perpendicularly with a direction of a relative movement of the vibrator and the contact member.

4. The vibration driving device according to claim 1, wherein the control device further comprises:
a signal generation unit configured to generate pulse signals; and
a voltage generation unit configured to generate drive voltage applied to the electro-mechanical energy conversion element using the pulse signals, and
wherein the adjustment unit decreases the amplitude of the vibration excited in the vibrator by decreasing pulse width of the pulse signals.

5. The vibration driving device according to claim 4, wherein the pulse signals comprise two-phase pulse signals of which phases differ, and wherein the adjustment unit decreases the amplitude of the vibration excited in the vibrator by decreasing pulse width of the two-phase pulse signals and by increasing phase difference of the two-phase pulse signals.

6. The vibration driving device according to claim 5, wherein the adjustment unit increases the phase difference of the two-phase pulse signals and increases a control gain of the phase difference.

7. The vibration driving device according to claim 6, wherein the adjustment unit increases the control gain in accordance with one of a value and a change amount of the pulse width of the two-phase pulse signals.

8. The vibration driving device according to claim 1, wherein the control device further comprises:
a signal generation unit configured to generate pulse signals; and
a voltage generation unit configured to generate drive voltage applied to the electro-mechanical energy conversion element using the pulse signals, and
wherein the adjustment unit decreases the amplitude of the vibration excited in the vibrator by increasing frequency of the pulse signals.

9. The vibration driving device according to claim 8, wherein the pulse signals comprise two-phase pulse signals of which phases differ, and
wherein the adjustment unit decreases the amplitude of the vibration excited in the vibrator by increasing the frequency of the two-phase pulse signals and by increasing a control gain of the phase difference of the two-phase pulse signals.

10. The vibration driving device according to claim 9, wherein the adjustment unit increases the control gain in accordance with one of a value and a change amount of the frequency of the two-phase pulse signals.

11. The vibration driving device according to claim 4, wherein the control device further comprises a storage unit configured to store learning data of a parameter about the pulse signals for decreasing the amplitude of the vibration excited in the vibrator, and wherein the adjustment unit decreases the amplitude of the vibration excited in the vibrator based on the learning data.

12. The vibration driving device according to claim 1, wherein the control device further comprises a position detection unit configured to detect position information showing relative position of the vibrator and the contact member, and wherein the speed detection unit detects the relative speed of the vibrator and the contact member based on the position information obtained from the position detection unit.

13. A control device that controls drive of a vibration actuator equipped with a vibrator, which has an elastic member and an electro-mechanical energy conversion element, and a contact member that contacts the vibrator, the control device comprising:

a speed detection unit configured to detect speed information showing relative speed of the vibrator and the contact member; and an adjustment unit configured to decrease amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator.

14. A control method for a vibration actuator equipped with a vibrator, which has an elastic member and an electro-mechanical energy conversion element, and a contact member that contacts the vibrator, the control method comprising:

a step of detecting speed information showing relative speed of the vibrator and the contact member; and a step of decreasing amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator.

15. An apparatus comprising:

a vibration driving device comprising:

a vibration actuator comprising:

a vibrator that has an elastic member and an electro-mechanical energy conversion element; and a contact member that contacts the vibrator; and a control device that controls drive of the vibration actuator, the control device comprising:

a speed detection unit configured to detect speed information showing relative speed of the vibrator and the contact member; and an adjustment unit configured to decrease amplitude of vibration excited in the vibrator in a case where the speed detection unit detects that a state where the vibration actuator does not operate approximately and a state where the vibration actuator operates at a speed faster than a target driving speed occur alternately after starting to drive the vibration actuator; and a component that is driven by the vibration driving device.

* * * * *